United States Patent
Zhao

(10) Patent No.: US 10,028,149 B2
(45) Date of Patent: Jul. 17, 2018

(54) METHOD AND APPARATUS FOR MANAGING NETWORK SHARING

(71) Applicant: Huawei Technologies Co., Ltd., Shenzhen (CN)

(72) Inventor: Dong Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 15/143,214

(22) Filed: Apr. 29, 2016

(65) Prior Publication Data

US 2016/0249228 A1    Aug. 25, 2016

Related U.S. Application Data

(63) Continuation of application No. PCT/CN2013/086204, filed on Oct. 30, 2013.

(51) Int. Cl.
*H04W 16/14* (2009.01)
*H04M 15/00* (2006.01)
(Continued)

(52) U.S. Cl.
CPC .......... *H04W 16/14* (2013.01); *H04L 12/56* (2013.01); *H04L 12/5692* (2013.01);
(Continued)

(58) Field of Classification Search
CPC ....... H04W 4/24; H04W 24/10; H04W 88/06; H04W 48/08; H04W 16/14;
(Continued)

(56) References Cited

U.S. PATENT DOCUMENTS

2008/0207170 A1*  8/2008  Khetawat ............ H04W 60/005
                                                                        455/411
2009/0325625 A1   12/2009  Hugl et al.
(Continued)

FOREIGN PATENT DOCUMENTS

CN       101511131 A       8/2009
CN       103139015 A       6/2013
(Continued)

OTHER PUBLICATIONS

"3rd Generation Partnership Project; Technical Specification Group Services and System Aspects; Telecommunication management; Charging management; Charging Architecture and principles (Release 12)," 3GPP TS 32.240, V12.2.0, pp. 1-48, 3rd Generation Partnership Program, Valbonne, France (Sep. 2013).
(Continued)

*Primary Examiner* — Olumide T Ajibade Akonai
*Assistant Examiner* — Margaret G Mastrodonato
(74) *Attorney, Agent, or Firm* — Leydig, Voit & Mayer, Ltd.

(57) ABSTRACT

The present invention relates to a method and an apparatus for managing network sharing, where the method includes: acquiring, by an access network element, information about occupation of a resource of an access network element by a network sharing party; and reporting, by the access network element, the occupation information to a core network device, where the occupation information is used by the core network device to charge a user equipment UE that accesses the access network element. By acquiring and reporting information about occupation of a resource of an access network element by a network sharing party, the present invention enables a core network device such as a charging system to perform accurate charging according to the infor-
(Continued)

mation about occupation of the resource of the access network element by the network sharing party.

15 Claims, 4 Drawing Sheets

(51) Int. Cl.
　　*H04L 12/54*　　(2013.01)
　　*H04W 48/08*　　(2009.01)
　　*H04W 24/10*　　(2009.01)
　　*H04W 4/24*　　(2018.01)
　　*H04W 84/04*　　(2009.01)

(52) U.S. Cl.
　　CPC ............. *H04M 15/44* (2013.01); *H04W 4/24* (2013.01); *H04W 24/10* (2013.01); *H04W 48/08* (2013.01); *H04M 15/07* (2013.01); *H04W 84/042* (2013.01)

(58) Field of Classification Search
　　CPC ...... H04W 84/042; H04L 12/14; H04L 12/56; H04L 12/5692; H04M 15/00; H04M 15/66; H04M 15/44; H04M 15/07
　　See application file for complete search history.

(56) References Cited

U.S. PATENT DOCUMENTS

| 2010/0261473 | A1 | 10/2010 | Al-Bakri et al. |
| 2012/0030373 | A1 | 2/2012 | Yang |
| 2013/0003557 | A1* | 1/2013 | Vulkan ................ H04L 65/605 370/238 |

FOREIGN PATENT DOCUMENTS

| CN | 103237299 A | 8/2013 |
| EP | 2613596 A1 | 7/2013 |
| EP | 2395714 A1 | 12/2014 |

OTHER PUBLICATIONS

"3rd Generation Partnership Project; Technical Specification Group Services and System Aspects; Telecommunication management; Charging management; Charging Data Record (CDR) parameter description (Release 12)," 3GPP TS 32.298, V12.1.0, pp. 1-154, $3^{rd}$ Generation Partnership Program, Valbonne, France (Sep. 2013).

"3rd Generation Partnership Project; Technical Specification Group Services and System Aspects; Telecommunication management; Charging management; Circuit Switched (CS) domain charging (Release 11)," 3GPP TS 32.250, V11.1.0, pp. 1-111, $3^{rd}$ Generation Partnership Program, Valbonne, France (Mar. 2013).

"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)," 3GPP TS 32.762, V11.5.0, pp. 1-59, $3^{rd}$ Generation Partnership Program, Valbonne, France (Mar. 2013).

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP TS 32.522, V11.7.0, pp. 1-58, $3^{rd}$ Generation Partnership Program, Valbonne, France (Sep. 2013).

"3rd Generation Partnership Project; Technical Specification Group Services and System Aspects; Telecommunication Management; Self-Organizing Networks (SON); Concepts and requirements (Release 11)," 3GPP TS 32.500, V11.1.0, pp. 1-13. $3^{rd}$ Generation Partnership Program, Valbonne, France (Dec. 2011).

"3rd Generation Partnership Project; Technical Specification Group Services and System Aspects; Telecommunication management; Charging management; Diameter charging applications (Release 12)," 3GPP TS 32.299, V12.2.0, pp. 1-156, $3^{rd}$ Generation Partnership Program, Valbonne, France (Sep. 2013).

3rd Generation Partnership Project; Technical Specification Group Services and System Aspects; Telecommunication management; Charging management; Packet Switched PS) domain charging (Release 12), 3GPP TS 32.251, V12.3.0, pp. 1-96, $3^{rd}$ Generation Partnership Program, Valbonne, France (Sep. 2013).

* cited by examiner

METHOD AND APPARATUS FOR MANAGING NETWORK SHARING

CROSS REFERENCE

This application is a continuation of International Patent Application No. PCT/CN2013/086204 filed on Oct. 30, 2013, which is incorporated herein by reference in its entirety.

TECHNICAL FIELD

The present invention relates to network communications technologies, and in particular, to a method and an apparatus for managing network sharing.

BACKGROUND

With increasing development of communications network technologies, multiple operators or multiple public land mobile networks (Public Land Mobile Network, PLMN) can provide multiple services for a user. To save costs, a network sharing technology is usually used for multiple operators or multiple services.

Network sharing includes two scenarios: network element sharing and spectrum sharing.

Network element sharing means that different operators or different PLMNs share one or some network elements. For example, operator A and operator B share one access network element M. Different user equipments (User Equipment, UE) can receive services from both an operator A and an operator B by using the access network element M.

Spectrum sharing means that different operators or different PLMNs share one or more bands. For example, bandwidth available from access network elements of the operator A in certain areas is unable to meet user requirements due to limited spectrums. To increase service capacities or quality of the access network elements in these areas, the operator A leases some spectrums from the operator B.

The foregoing resources of access network elements which are occupied by UEs in network element sharing and spectrums occupied by UEs in spectrum sharing are both shared network resources. Load capacities of network resources or network elements involved in network sharing are all restricted to some extent. Therefore, in a network shared by multiple operators or in multiple PLMNs, an inevitable problem exists that the operators or PLMNs are incapable of charging a UE.

SUMMARY

Embodiments of the present invention provide a method and an apparatus for managing network sharing, which can solve an issue how a UE is charged in a network shared by multiple operators or in multiple PLMNs.

A first aspect of the embodiments of the present invention provides a method for managing network sharing, which is applied in a network management system and includes:

acquiring, by an access network element, information about occupation of a shared network resource occupied by a network sharing party; and reporting, by the access network element, the occupation information to a charging system, where the occupation information is used by the charging system to charge a user equipment UE that accesses the access network element.

Based on the first aspect, in a first possible implementation manner of the first aspect, the network sharing party is an operator of a home network of the UE or a network accessed by the UE; or, the network sharing party is a public land mobile network PLMN of the home network of the UE or a PLMN to which the network accessed by the UE belongs.

Based on the first aspect or the first possible implementation manner of the first aspect, in a second possible implementation manner of the first aspect, before the acquiring, by an access network element, information about occupation of a shared network resource occupied by a network sharing party, the method further includes:

distinguishing, by the access network element, the network sharing party according to at least one of: a static identifier of the UE, a user identifier of the UE, a cell radio network temporary identifier C-RNTI of a cell in which the UE is located, a connection context of the UE, information reported by the UE, and a network identifier of the network accessed by the UE.

Based on the first aspect or the first possible implementation manner of the first aspect, in a third possible implementation manner of the first aspect, before the acquiring, by an access network element, information about occupation of a shared network resource occupied by a network sharing party, the method further includes:

distinguishing, by the access network element, the network sharing party by using an X2/Iur interface between network elements of an access network or an Sn/Gn interface between network elements of a core network, where the network sharing party is an operator of a source network accessed by the UE when the UE moves or is handed over, or a PLMN of the source network.

Based on any one of the first aspect to the third possible implementation manner of the first aspect, in a fourth possible implementation manner of the first aspect, the shared network resource is a resource of the access network element, and the information about occupation of the shared network resource occupied by the network sharing party includes at least one type of the following data or is determined according to at least one type of the following data:

a first type of data, where the first type of data includes: data traffic generated by use of the access network element by the UE, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Based on any one of the first aspect to the fourth possible implementation manner of the first aspect, in a fifth possible implementation manner of the first aspect, the method further includes:

reporting, by the access network element, identifier or location information of the access network element to the core network device, where the identifier or location information of the access network element is used by the core network device to correlate the access network element with the occupation information reported by the access network element and then perform charging.

Based on any one of the first aspect to the fifth possible implementation manner of the first aspect, in a sixth possible implementation manner of the first aspect, the method further includes:

reporting, by the access network element, at least one of a service session identifier, a serving operator identifier, a serving PLMN identifier and an identifier of the UE which are corresponding to the occupation information to the core network device, for the core network device to correlate the occupation information with the network sharing party and then perform charging.

Based on any one of the first aspect to the sixth possible implementation manner of the first aspect, in a seventh possible implementation manner of the first aspect, the method further includes:

reporting, by the access network element, a service charging identifier of the UE to the core network device, where the service charging identifier is used by the core network device to correlate the occupation information with service charging of the UE and then perform charging.

Based on any one of the first aspect to the third possible implementation manner of the first aspect, in an eighth possible implementation manner of the first aspect, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information.

Based on the eighth possible implementation manner of the first aspect, in a ninth possible implementation manner of the first aspect, the information about the spectrum occupied by the spectrum sharing party in the shared spectrum includes at least one item of the following information:

the number of a spectrum used by the UE in the shared spectrum, a central frequency of the spectrum or a bandwidth of the spectrum.

Based on the eighth possible implementation manner of the first aspect or the ninth possible implementation manner of the first aspect, in a tenth possible implementation manner of the first aspect, the usage data corresponding to the spectrum information includes at least one item of the following:

an eighth type of data, where the eighth type of data includes at least one of: a type of a link occupied by the spectrum used by the UE, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Based on any one of the eighth possible implementation manner to the tenth possible implementation manner of the first aspect, in an eleventh possible implementation manner of the first aspect, the acquiring, by the access network element, information about a spectrum occupied by the spectrum sharing party in the shared spectrum, includes:

acquiring, by the access network element by using signaling for allocating a resource to the UE, signaling for instructing the UE by a network, identity data of the UE, or type data of the UE, information about a spectrum occupied in the shared spectrum by a home spectrum sharing party of the UE, or information about a spectrum occupied in the shared spectrum by a spectrum sharing party that serves the UE.

Based on any one of the eighth possible implementation manner to the eleventh possible implementation manner of the first aspect, in a twelfth possible implementation manner of the first aspect, the information about occupation of the shared network resource occupied by the network sharing party further includes a specific amount or a ratio by which the shared network resource occupied by the network sharing party exceeds a quota.

Based on any one of the first aspect to the twelfth possible implementation manner, in a thirteenth possible implementation manner of the first aspect, the core network device is a charging system, and the reporting, by the access network element, the occupation information to the core network device, includes:

determining, by the access network element, a charging interface for reporting the occupation information to the charging system, and reporting the occupation information to the charging system by using the charging interface.

Based on the thirteenth possible implementation manner of the first aspect, in a fourteenth possible implementation manner of the first aspect, the method further includes:

when the occupation information which is reported by the access network element meets a charging trigger condition, triggering, by the access network element through the charging interface by using a charging trigger, the charging system to perform charging.

A second aspect of the embodiments of the present invention provides a method for managing network sharing, including:

obtaining, by a core network device, information about occupation of a shared network resource occupied by a network sharing party; and charging, by the core network device according to the occupation information, a user equipment UE that accesses the access network element.

Based on the second aspect, in a first possible implementation manner of the second aspect, the network sharing party is an operator of a home network of the UE or a network accessed by the UE; or, the network sharing party is a public land mobile network PLMN of the home network of the UE or a PLMN to which the network accessed by the UE belongs.

Based on the second aspect or the first possible implementation manner of the second aspect, the shared network resource is a resource of the access network element, and the information about occupation of the shared network resource occupied by the network sharing party includes at least one type of the following data or is determined according to at least one type of the following data:

a first type of data, where the first type of data includes: data traffic generated by use of the access network element by the UE, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Based on any one of the second aspect to the second possible implementation manner of the second aspect, in a third possible implementation manner of the second aspect, the core network device receives the information which is about occupation of the shared network resource occupied by the network sharing party and is sent by the access network element, and the receiving includes:

receiving, by the core network device, the occupation information which is reported by the access network element through a charging interface, where the core network device is a charging system.

Based on any one of the second aspect to the third possible implementation manner of the second aspect, in a fourth possible implementation manner of the second aspect, the charging, by the core network device according to the occupation information, the UE, includes:

receiving, by the core network device, identifier or location information of the access network element which is sent by the access network element; and correlating, by the core network device, the access network element with the occupation information by using the identifier or location information of the access network element, and then performing charging.

Based on any one of the second aspect to the fourth possible implementation manner of the second aspect, in a fifth possible implementation manner of the second aspect, the charging, by the core network device according to the occupation information, the UE, includes:

receiving, by the core network device, at least one of a service session identifier, a serving operator identifier, a serving PLMN identifier and an identifier of the UE which are corresponding to the occupation information and sent by the access network element; and correlating, by the core network device, the occupation information with the network sharing party by using at least one of the service session identifier, the serving operator identifier, the serving PLMN identifier and the identifier of the UE, and then performing charging.

Based on any one of the second aspect to the fifth possible implementation manner of the second aspect, in a sixth possible implementation manner of the second aspect, the charging, by the core network device according to the occupation information, the UE, includes:

receiving, by the core network device, a service charging identifier of the UE which is sent by the access network element; and correlating, by the core network device, the occupation information with service charging of the UE that accesses the access network element, and then performing charging.

Based on the second aspect or the first possible implementation manner of the second aspect, in a seventh possible implementation manner of the second aspect, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information, which are sent by the access network element.

Based on the seventh possible implementation manner of the second aspect, in an eighth possible implementation manner of the second aspect, the information about the spectrum occupied by the spectrum sharing party in the shared spectrum includes at least one item of the following:

the number of a spectrum used by the UE in the shared spectrum, a central frequency of the spectrum or a bandwidth of the spectrum.

Based on the seventh possible implementation manner or the eighth possible implementation manner of the second aspect, in a ninth possible implementation manner of the second aspect, the usage data corresponding to the spectrum information includes at least one item of the following:

an eighth type of data, where the eighth type of data includes at least one of: a type of a link occupied by the spectrum used by the UE in the shared spectrum, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Based on the second aspect or the first possible implementation manner of the second aspect, in a tenth possible implementation manner of the second aspect, the core network device receives the information which is about occupation of the shared network resource occupied by the network sharing party and is sent by the access network element, and the receiving includes:

receiving, by the core network device, a specific amount or a ratio by which the shared network resource occupied by the network sharing party exceeds a quota, where the specific amount or the ratio is sent by the access network element; and the charging, by the core network device according to the occupation information, the UE, includes:

performing charging, by the core network device according to the specific amount or the ratio by which the shared network resource occupied by the network sharing party exceeds the quota, for the shared network resource occupied by the network sharing party in excess of the quota.

A third aspect of the embodiments of the present invention provides an access network element, including:

an obtaining unit, configured to acquire information about occupation of a shared network resource occupied by a network sharing party; and a reporting unit, configured to report the occupation information to a core network device, where the occupation information is used by the core network device to charge a user equipment UE that accesses the access network element.

Based on the third aspect, in a first possible implementation manner of the third aspect, the network sharing party is an operator of a home network of the UE or a network accessed by the UE; or, the network sharing party is a public land mobile network PLMN of the home network of the UE or a PLMN to which the network accessed by the UE belongs.

Based on the third aspect or the first possible implementation manner of the third aspect, in a second possible implementation manner of the third aspect, the access network element further includes a distinguishing unit;

the distinguishing unit is configured to distinguish the network sharing party according to at least one of: a static identifier of the UE, a user identifier of the UE, a source C-RNTI of the UE, a connection context of the UE, information reported by the UE, and a network accessed by the UE; or, the distinguishing unit is configured to distinguish the network sharing party according to an X2/Iur interface between network elements of an access network or an Sn/Gn interface between network elements of a core network, where the network sharing party is an operator of a source network accessed by the UE when the UE moves or is handed over, or a PLMN of the source network.

Based on any one of the third aspect to the second possible implementation manner of the third aspect, in a third possible implementation manner of the third aspect, the obtaining unit is specifically configured to acquire at least one type of the following data:

a first type of data, where the first type of data includes: data traffic generated by use of the access network element by the UE, duration in which the UE uses a resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Based on the third aspect to the third possible implementation manner of the third aspect, in a fourth possible implementation manner of the third aspect, the reporting unit is further configured to:

report identifier or location information of the access network element to the core network device, where the identifier or location information of the access network element is used by the core network device to correlate the access network element with the occupation information reported by the access network element and then perform charging.

Based on the third aspect to the fourth possible implementation manner of the third aspect, in a fifth possible implementation manner of the third aspect, the reporting unit is further configured to:

report at least one of a service session identifier, a serving operator identifier, a serving PLMN identifier and an identifier of the UE which are corresponding to the occupation information to the core network device, for the core network device to correlate the occupation information with the network sharing party and then perform charging.

Based on any one of the third aspect to the fifth possible implementation manner of the third aspect, in a sixth possible implementation manner of the third aspect, the reporting unit is further configured to:

report, by the access network element, a service charging identifier of the UE to the core network device, where the service charging identifier is used by the core network device to correlate the occupation information with service charging of the UE and then perform charging.

Based on any one of the third aspect to the second possible implementation manner of the third aspect, in a seventh possible implementation manner of the third aspect, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information.

Based on the seventh possible implementation manner of the third aspect, in an eighth possible implementation manner of the third aspect, the information about the spectrum occupied by the spectrum sharing party in the shared spectrum includes at least one item of the following information:

the number of a spectrum used by the UE in the shared spectrum, a central frequency of the spectrum or a bandwidth of the spectrum.

Based on the seventh possible implementation manner or the eighth possible implementation manner of the third aspect, in a ninth possible implementation manner of the third aspect, the usage data corresponding to the spectrum information includes at least one item of the following:

an eighth type of data, where the eighth type of data includes at least one of: a type of a link occupied by the spectrum used by the UE, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Based on any one of the seventh possible implementation manner to the ninth possible implementation manner of the third aspect, in a tenth possible implementation manner of the third aspect, the obtaining unit is specifically configured to:

acquire, by using signaling for allocating a resource to the UE, signaling for instructing the UE by a network, identity data of the UE, or type data of the UE, information about a spectrum occupied in the shared spectrum by a home spectrum sharing party of the UE, or information about a spectrum occupied in the shared spectrum by a spectrum sharing party that serves the UE.

Based on any one of the third aspect to the tenth possible implementation manner of the third aspect, in an eleventh possible implementation manner of the third aspect, the information about occupation of the shared network resource occupied by the network sharing party further includes a specific amount or a ratio by which the shared network resource occupied by the network sharing party exceeds a quota.

Based on the third aspect to the eleventh possible implementation manner of the third aspect, in a twelfth possible implementation manner of the third aspect, the core network device is a charging system, and the reporting unit is specifically configured to:

determine a charging interface for reporting the occupation information to the charging system, and use the charging interface to report the occupation information to the charging system.

Based on the twelfth possible implementation manner of the third aspect, in a thirteenth possible implementation manner of the third aspect, the reporting unit is specifically configured to:

when the occupation information which is reported by the access network element meets a charging trigger condition, trigger, through the charging interface by using a charging trigger, the charging system to perform charging.

A fourth aspect of the embodiments of the present invention provides a core network device, including:

an obtaining unit, configured to obtain information about occupation of a shared network resource occupied by a network sharing party; and a processing unit, configured to charge, according to the occupation information, a user equipment UE that accesses the access network element.

Based on the fourth aspect, in a first possible implementation manner of the fourth aspect, the network sharing party is an operator of a home network of the UE or a network accessed by the UE; or, the network sharing party is a public land mobile network PLMN of the home network of the UE or a PLMN to which the network accessed by the UE belongs.

Based on the fourth aspect or the first possible implementation manner of the fourth aspect, in a second possible implementation manner of the fourth aspect, the shared network resource is a resource of the access network element, and the information about occupation of the shared network resource occupied by the network sharing party includes at least one type of the following data:

a first type of data, where the first type of data includes: data traffic generated by use of the access network element by the UE, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Based on any one of the fourth aspect to the second possible implementation manner of the fourth aspect, in a third possible implementation manner of the fourth aspect, the obtaining unit is specifically configured to receive the occupation information which is reported by the access network element through a charging interface, where the core network device is a charging system.

Based on any one of the fourth aspect to the second possible implementation manner of the fourth aspect, in a fourth possible implementation manner of the fourth aspect, where, the obtaining unit is specifically configured to receive identifier or location information of the access network element which is sent by the access network element; and the processing unit is specifically configured to correlate the access network element with the occupation information by using the identifier or location information of the access network element, and then perform charging.

Based on any one of the fourth aspect to the second possible implementation manner of the fourth aspect, in a fifth possible implementation manner of the fourth aspect, where, the obtaining unit is specifically configured to receive at least one of a service session identifier, a serving operator identifier, a serving PLMN identifier and an identifier of the UE which are corresponding to the occupation information and sent by the access network element; and the processing unit is specifically configured to correlate the occupation information with the network sharing party by using at least one of the service session identifier, the serving operator identifier, the serving PLMN identifier and the identifier of the UE, and then perform the charging.

Based on any one of the fourth aspect to the second possible implementation manner of the fourth aspect, in a fifth possible implementation manner of the fourth aspect, the obtaining unit is specifically configured to receive a service charging identifier of the UE which is sent by the access network element; and the processing unit is specifically configured to correlate the occupation information with service charging of the UE that accesses the access network element, and then perform the charging.

Based on the fourth aspect or the first possible implementation manner of the fourth aspect, in a sixth possible implementation manner of the fourth aspect, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information, which are sent by the access network element.

Based on the sixth possible implementation manner of the fourth aspect, in a seventh possible implementation manner of the fourth aspect, the information about the spectrum occupied by the spectrum sharing party in the shared spectrum includes at least one item of the following:

the number of a spectrum used by the UE in the shared spectrum, a central frequency of the spectrum or a bandwidth of the spectrum.

Based on the seventh possible implementation manner of the fourth aspect, in an eighth possible implementation manner of the fourth aspect, the usage data corresponding to the spectrum information includes at least one item of the following:

an eighth type of data, where the eighth type of data includes at least one of: a type of a link occupied by the spectrum used by the UE in the shared spectrum, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Based on the fourth aspect or the first possible implementation manner of the fourth aspect, in a ninth possible implementation manner of the fourth aspect, the obtaining unit is specifically configured to receive a specific amount or a ratio by which the shared network resource occupied by the network sharing party exceeds a quota, where the specific amount or the ratio is sent by the access network element; and the processing unit is specifically configured to perform charging, according to the specific amount or the ratio by which the shared network resource occupied by the network sharing party exceeds the quota, for the shared network resource occupied by the network sharing party in excess of the quota.

By applying the technical solutions provided in the embodiments of the present invention, a core network device obtains information about occupation of a shared network resource occupied by a network sharing party, so that the core network device can perform accurate charging for a UE under an access network element in a network sharing application scenario according to the information about occupation of the shared network resource occupied by the network sharing party.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
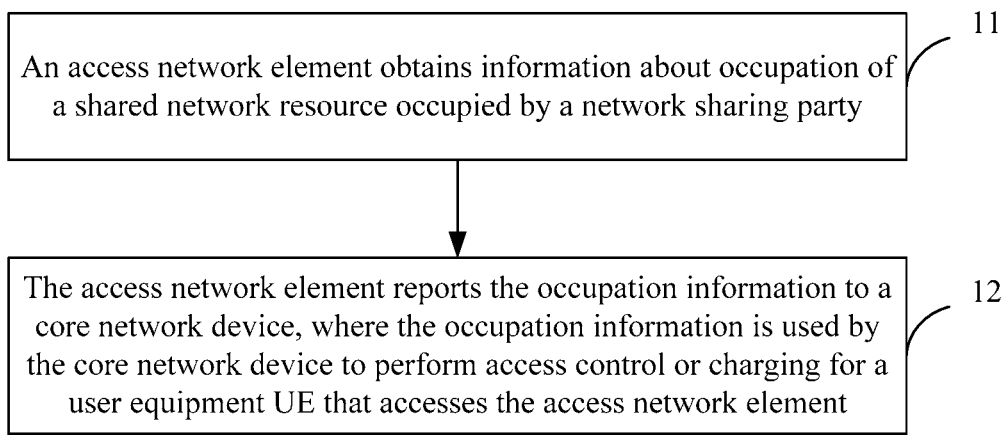
FIG. 1 is a flowchart of a method for managing network sharing according to an embodiment of the present invention.

FIG. 1 is a flowchart of a method for managing network sharing according to an embodiment of the present invention. The network sharing may be network element sharing (such as a shared access network element) or spectrum sharing. The method provided in this embodiment is described by using an access network element (such as a base station) as an execution body. The method provided in the embodiment of the present invention includes the following steps:

Step 11: An access network element acquires information about occupation of a shared network resource occupied by a network sharing party.

The shared network resource may be a resource existent on the access network element and shared in a network element sharing application scenario, or, the shared network resource may be a spectrum shared in spectrum sharing. The access network element is a network element accessed by a UE.

The network sharing party may be an operator of a home network of the UE or the network accessed by the UE; or, the network sharing party is a public land mobile network (Public Land Mobile Network, PLMN for short) of the home network of the UE or a PLMN to which the network accessed by the UE belongs.

When the shared network resource is a resource on a shared access network element, the network sharing party of the shared network resource is the access network element accessed by the UE, and the access network element may be the operator or PLMN of the network accessed by the UE. When the shared network resource is specifically a shared spectrum, a shared resource owner is an owner of the shared spectrum, for example, the operator or PLMN of the network.

The network sharing party is an operator of a home network of the UE that accesses the access network element, or the network accessed by the UE; or, the network sharing party is a PLMN of the home network of the UE that accesses the access network element, or a PLMN to which the network accessed by the UE belongs. The access network element may acquire the occupation information of the shared resource of the access network element based on operator or PLMN.

Before the information about occupation of the resource of the access network element by the network sharing party is acquired, the method may further include the following:

the access network element may distinguish the network sharing party according to a static identifier (an international mobile equipment identifier IMEI, a mobile phone type, and the like) of the UE that accesses the network element, a subscriber identity of the UE such as an international mobile subscriber identification number (International Mobile Subscriber Identification Number, IMSI) or a temporary mobile subscriber identity (Temporary Mobile Subscriber Identity, TMSI for short), a source cell radio network temporary identifier (Cell Radio Network Temporary Identifier, C-RNTI for short) of the UE, a connection context of the UE, information reported by the UE, or the network accessed by the UE; or the access network element may distinguish the network sharing party by using an X2/Iur interface between network elements of an access network or an Sn/Gn (n=1 to 13) interface between network elements of a core network, where the network sharing party is an operator of a source network accessed by the UE when the UE moves or is handed over, or a PLMN of the source network.

The access network element acquires the information about occupation of the resource of the access network element by the operator or PLMN (that is, the operator or PLMN that is of the home or accessed network of the UE that accesses the access network element and is distinguished by the access network element).

The occupation information includes at least one type of the following data or is determined according to at least one type of the following data:

a first type of data, where the first type of data includes: data traffic generated by use of the access network element by the UE that accesses the access network element, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that access the access network element and support different numbers of multi-input multi-output MIMO streams, duration in which each type of UE that accesses the access network element occupies the access network element, and power consumption of the access network element caused by occupation of the resource occupied by each type of UE that accesses the access network element;

a fourth type of data, where the fourth type of data includes at least one of: an air interface resource of the access network element which is occupied by the UE that accesses the access network element, duration in which the air interface resource is occupied, and power consumption of the access network element caused by occupation of the air interface resource;

a fifth type of data, where the fifth type of data includes at least one of: a transmission resource of the access network element which is occupied by the UE that accesses the access network element, duration in which the transmission resource is occupied, and power consumption of the access network element caused by occupation of the transmission resource;

a sixth type of data, where the sixth type of data includes at least one of: a processor resource of the access network element which is occupied by the UE that accesses the access network element, duration in which the processor resource is occupied, and power consumption of the access network element caused by occupation of the processor resource; and a seventh type of data, where the seventh type of data includes at least one of: a storage resource of the access network element which is occupied by the UE that accesses the access network element, duration in which the storage resource is occupied, and power consumption of the access network element caused by occupation of the storage resource.

When the network sharing party is specifically a spectrum sharing party, the shared network resource is a shared spectrum for the spectrum sharing party from the access network element.

Correspondingly, information about occupation of the shared spectrum by the network sharing party includes but is not limited to:

acquiring, by the access network element, either or a combination of information about a spectrum occupied by the spectrum sharing party in the shared spectrum, and usage data corresponding to the spectrum information, where the spectrum sharing party is an operator or PLMN that uses the shared spectrum.

The information about the spectrum occupied by the spectrum sharing party in the shared spectrum may include, for example, at least one item of the following information:

the number of a spectrum used by the UE served by the spectrum sharing party in the shared spectrum, a central frequency of the spectrum or a bandwidth of the spectrum.

Alternatively, for example, by using signaling for allocating a resource to the UE, signaling for instructing the UE by a network, identity data of the UE, or type data of the UE, the access network element acquires information about a spectrum occupied in the shared spectrum by a home spectrum sharing party of the UE that uses the shared spectrum, or information about a spectrum occupied in the shared spectrum by a spectrum sharing party that serves the UE that uses the shared spectrum.

The usage data corresponding to the spectrum information includes at least one item of the following:

an eighth type of data, where the eighth type of data includes at least one of: a type of a link occupied by the spectrum used by the UE that accesses the access network element, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Further, the acquiring, by the access network element, the information about occupation of the shared spectrum by the network sharing party, includes:

acquiring, by the access network element, a specific amount or a ratio by which the resource of the access network element or the shared spectrum occupied by the network sharing party exceeds a quota.

The quota is a ration allocated to the network sharing party for using the shared network resource. When this quota is exceeded, charging may be performed at a new tariff rate. For example, a lower tariff rate is used in order to encourage users to access the network, and a higher tariff rate is used in order to restrict too many users from accessing the network. The ration of the shared resource used by the network sharing party may be a ration of the resource of the access network element occupied by the network sharing party, and specifically, may be a ration of the shared spectrum occupied by the spectrum sharing party. The ration may be at least one of: a specified duration, a time point, a data traffic volume or rate, a central processing unit (CPU) occupancy rate, and a bandwidth occupancy rate.

Step 12: The access network element reports the occupation information to a core network device, where the occupation information is used by the core network device to charge a UE that accesses the access network element.

For example, when the occupation of the shared network resource occupied by an operator exceeds the quota, a UE of the operator is restricted from accessing, so as to forbid the operator from further occupying the shared resource. When the operator does not exceed the quota, a UE of the operator is allowed to continue accessing and occupying the shared resource.

When the shared network resource is a resource of the access network element, the access network element may be an evolved base station (evolved Node B, eNB), a radio network controller (Radio Network Controller, RNC), a base station controller (Base Station Controller, BSC), or the like; a connection interface between the access network element and another access network may be X2, Iur, or the like; a connection interface between the access network element and a core network A and a core network B may be S1 or Iu (S1/Iu), and a connection interface between the access network element and the charging system may be Ga, Rf, Ro, or the like.

In the embodiment of the present invention, the core network device, such as a mobility management entity (Mobility Management Entity, MME), a serving general packet radio service (General Packet Radio Service, GPRS) support node (Serving GPRS Support Node, SGSN), and a mobile switching center (Mobile Switching Center, MSC), may communicate with a UE by means of the access network element. An interface between core network devices may be Sn/Gn. If the core network device is not a charging system, a charging interface between the core network device and a charging function module of the charging system is Gf or Go, where the interface may be used to forward charging data of the network sharing party on the shared network resource, and report the charging data to the charging system for charging. For example, the charging system may control access of UEs by using a higher or lower tariff rate.

The access network element may forward the charging data of the network sharing party on the shared network resource to another access-network network element through the X2 or Iur interface, the another access-network network element reports the charging data to a core network device through the S1/Iu interface, and the core network device reports the charging data to the charging system through the charging interface Gf or Go; or, the access network element may report the charging data to a core-network network element through the S1/Iu interface, and the core network device reports the charging data to the charging system through the charging interface Gf or Go; or, the access network element may report the charging data to the charging system directly through the Ga, Rf or Ro interface.

When the access network element can send the charging data to the core network device, the access network element may forward the charging data to another core network device through the Sn/Gn (n=1 to 13) interface, and the another core network device reports the charging data to the charging system through the charging interface Gf or Go; or, the access network element may report the charging data to the charging system directly through Gf or Go.

The charging data includes the information about occupation of the shared network resource occupied by the network sharing party and/or identity information of the network sharing party such as an operator identifier or a PLMN identifier.

In this way, before the access network element reports the acquired occupation information (that is, the information about occupation of the resource of the access network element by each operator or PLMN) to the charging system, the method may include:

setting, by the access network element, a charging interface between the access network element and the charging system, such as a Ga, Rf or Ro interface, so that the access network element can report the charging data to the charging system directly.

Further, the reporting, by the access network element, the occupation information to the core network device, includes:

determining, by the access network element, a charging interface for reporting the occupation information to the charging system, and reporting the occupation information to the charging system by using the charging interface, where the charging interface may be a new charging interface that is set by the access network element and is between the access network element and the charging system, and may also be an existing charging interface such as Gf or Go.

Further, the method in the embodiment of the present invention may further include:

when the occupation information which is reported by the access network element meets a charging trigger condition, triggering, by the access network element through the charging interface by using a charging trigger, the core network device (such as the charging system) to perform charging.

The charging trigger may be a threshold or a specified value corresponding to the charging data, or an event corresponding to the charging data, and the charging interface may be a charging interface that is set by the access network element and is between the access network element and the charging system, or may be an existing charging interface such as Gf or Go.

Further, the method provided in the embodiment of the present invention may further include:

reporting, by the access network element, identifier or location information of the access network element to the core network device, where the identifier or location information of the access network element is used by the core network device to correlate the access network element with the occupation information reported by the access network element and then perform charging. For example, the core network device may learn, according to the identifier or location information of the access network element, which specific network element is a network element shared by the network sharing party, and charge, according to occupation information correlated with different network elements, UEs that access different network elements.

Further, the method provided in the embodiment of the present invention may further include:

reporting, by the access network element and to the core network device, at least one of a service session identifier, a serving operator identifier, a serving PLMN identifier and a UE identifier which are corresponding to the occupation information, for the core network device to correlate the occupation information with the network sharing party and then perform charging. For example, the core network device may determine a network sharing party according to at least one of the foregoing identifiers, so that the core network device can charge a UE served by the determined network sharing party.

Further, the method provided in the embodiment of the present invention may further include:

reporting, by the access network element, a service charging identifier of the UE that accesses the access network element to the core network device, where the service charging identifier is used by the core network device to correlate the occupation information with service charging of the UE that accesses the access network element and then perform charging. For example, the UE that uses the service is charged based on operator or PLMN.

When the network sharing is spectrum sharing, the reporting, by the access network element, the occupation information to the core network device, includes:

reporting, by the access network element, either or a combination of the spectrum information and the usage data corresponding to the spectrum information to a charging system of an owner of the shared spectrum or the network sharing party through a charging interface, so that the owner of the shared spectrum or the sharing party performs charging according to the information about the spectrum occupied by the spectrum sharing party in the shared spectrum and the usage data corresponding to the spectrum information, or performs inter-network settlement and charging through an inter-network settlement interface. For details of the information about the spectrum, refer to the description in step 11.

The reporting, by the access network element, either or a combination of the spectrum information and the usage data corresponding to the spectrum information to a charging system of an owner of the shared spectrum or the sharing party through a charging interface, includes:

reporting, by the access network element under triggering of a charging trigger, either or a combination of the spectrum information and the usage data corresponding to the spectrum information to the charging system of the owner of the shared spectrum or the sharing party through the charging interface.

Further, when the acquired information about occupation of the shared network resource occupied by the network sharing party includes a specific amount or a ratio by which the shared network resource occupied by the network sharing party exceeds a quota, the reporting, by the access network element, the occupation information to the core network device, includes:

reporting, by the access network element, the specific amount or the ratio by which the quota is exceeded, to the core network device, so that the charging system uses a new tariff rate to perform charging for a part that exceeds the quota, thereby increasing flexibility of charging.

The method for managing network sharing provided in the embodiment is also applicable to spectrum usage charging involved in carrier aggregation, where the handling manner is the same as the foregoing charging manner of spectrum sharing.

By acquiring and reporting information about occupation of a resource of an access network element by a network sharing party, the method for managing network sharing provided in the foregoing embodiment enables a core network device such as a charging system to perform accurate charging in a network sharing scenario according to the information about occupation of the resource of the access network element by the network sharing party.

Figure 2:
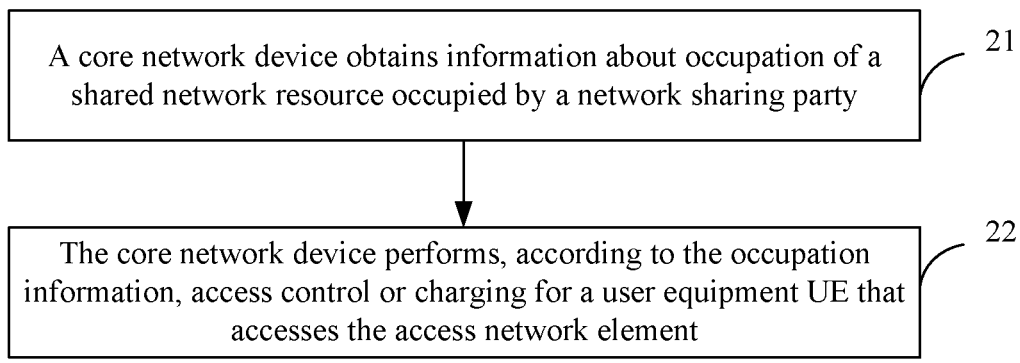
FIG. 2 is a flowchart of a method for managing network sharing according to another embodiment of the present invention.

FIG. 2 is a flowchart of a method for managing network sharing according to another embodiment of the present invention. All features in the embodiment shown in FIG. 2 and the embodiment shown in FIG. 1 can be reference to each other. For technical terms same as those in the embodiment shown in FIG. 1, this embodiment may provide no repeated description. The management method described in this embodiment is a processing procedure of a core network device (where the core device may be a charging system), which includes the following steps:

Step 21: A core network device acquires information about occupation of a shared network resource occupied by a network sharing party.

In the embodiment of the present invention, the shared network resource may include a resource of an access network element that is shared by the network sharing party, or a shared spectrum for a spectrum sharing party from an access network element, which is described in the embodiment shown in FIG. 1. Correspondingly, the core network device may acquire information about occupation of the resource or shared spectrum of the access network element by the network sharing party.

When the shared network resource is a resource of an access network element, the core network device may receive the information about occupation of the shared network resource occupied by the network sharing party from an access network element accessed by a UE.

When the shared network resource is a shared spectrum for a spectrum sharing party from an access network element, the core network device may receive the information about occupation of the shared spectrum by the network sharing party from the access network element, or the core network device itself collects statistics on the information about occupation of the shared spectrum by the network sharing party.

Step 22: The core network device charges, according to the occupation information, a user equipment UE that accesses the access network element.

In the embodiment of the present invention, when the shared network resource is a resource of an access network element, the occupation information may include at least one item of the following data or may be determined according to at least one item of the following data:

a first type of data, where the first type of data includes: data traffic generated by use of the access network element by the UE that accesses the access network element, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that access the access network element and support different numbers of multi-input multi-output MIMO streams, duration in which each type of UE that accesses the access network element occupies the access network element, and power consumption of the access network element caused by occupation of the resource occupied by each type of UE that accesses the access network element;

a fourth type of data, where the fourth type of data includes at least one of: an air interface resource of the access network element which is occupied by the UE that accesses the access network element, duration in which the air interface resource is occupied, and power consumption of the access network element caused by occupation of the air interface resource;

a fifth type of data, where the fifth type of data includes at least one of: a transmission resource of the access network element which is occupied by the UE that accesses the access network element, duration in which the transmission resource is occupied, and power consumption of the access network element caused by occupation of the transmission resource;

a sixth type of data, where the sixth type of data includes at least one of: a processor resource of the access network element which is occupied by the UE that accesses the access network element, duration in which the processor resource is occupied, and power consumption of the access network element caused by occupation of the processor resource; and a seventh type of data, where the seventh type of data includes at least one of: a storage resource of the access network element which is occupied by the UE that accesses the access network element, duration in which the storage resource is occupied, and power consumption of the access network element caused by occupation of the storage resource.

Further, the core network device receives the information which is about occupation of the shared network resource occupied by the network sharing party and is sent by the access network element, and the receiving includes:

receiving, by the core network device, the occupation information which is reported by the access network element through a charging interface, where the core network device is a charging system.

Further, the method for managing network sharing provided in this embodiment may further include: receiving, by the core network device, identifier or location information of the access network element which is sent by the access network element, so that the core network device correlates the access network element with the occupation information which is reported by the access network element and then performs charging.

Further, the method for managing network sharing provided in this embodiment may further include: receiving, by the core network device, at least one of a service session identifier, a serving operator identifier, a serving PLMN identifier and a UE identifier, which are sent by the access network element and correspond to the occupation information, so that the core network device correlates the occupation information with the network sharing party.

Further, the method for managing network sharing provided in this embodiment may further include:

receiving, by the core network device, a service charging identifier of the UE that accesses the access network element, where the service charging identifier is sent by the access network element, so that the core network device correlates the occupation information with service charging of the UE that accesses the access network element and then performs the charging.

For another example, the core network device receives the information which is about occupation of the shared network resource occupied by the network sharing party and is sent by the access network element, and the receiving includes:

receiving, by the core network device, either or a combination of information about a spectrum occupied by the spectrum sharing party in the shared spectrum, and usage data corresponding to the spectrum information, which are sent by the access network element.

Further, the receiving, by the core network device, information about a spectrum occupied by the spectrum sharing party in the shared spectrum, includes:

receiving, by the core network device, at least one item of the following information:

the number of a spectrum used by the UE served by the spectrum sharing party in the shared spectrum, a central frequency of the spectrum or a bandwidth of the spectrum.

Further, the usage data corresponding to the spectrum information includes at least one item of the following:

an eighth type of data, where the eighth type of data includes at least one of: a type of a link occupied by the spectrum used by the UE in the shared spectrum, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Further, the core network device may receive a service charging identifier of the UE that accesses the access network element, where the service charging identifier is sent by the access network element, so that the core network device correlates the occupation information with service charging of the UE that accesses the access network element and then performs the charging.

For example, the core network device receives the information which is about occupation of the shared network resource occupied by the network sharing party and is sent by the access network element, and the receiving includes:

receiving, by the core network device and directly through a charging interface, either or a combination of spectrum information of the access network element or another core-network network element, and usage data corresponding to the spectrum information.

The charging, by the core network device according to the occupation information, a user equipment UE that accesses the access network element, includes:

performing, by the core network device, charging according to the information about the spectrum occupied by the spectrum sharing party in the shared spectrum, or the usage data corresponding to the spectrum information, or performing inter-network settlement and charging through an inter-network settlement interface.

Further, the core network device receives the information which is about occupation of the shared network resource occupied by the network sharing party and is sent by the access network element, and the receiving includes:

receiving, by the core network device, a specific amount or a ratio by which the shared resource occupied by the network sharing party exceeds a quota, where the specific amount or the ratio is sent by the access network element.

Further, the charging, by the core network device according to the occupation information, a user equipment UE that accesses the access network element, includes:

performing, by the core network device, charging for the shared resource occupied by the network sharing party in excess of the quota, where charging is performed at a new tariff rate according to the specific amount or the ratio by which the shared resource occupied by the network sharing party exceeds the quota.

The core network device obtains the information about occupation of the shared network resource occupied by the network sharing party, so that the core network device performs accurate charging for the shared network resource used by the UE, with respect to different network sharing parties.

Figure 3:
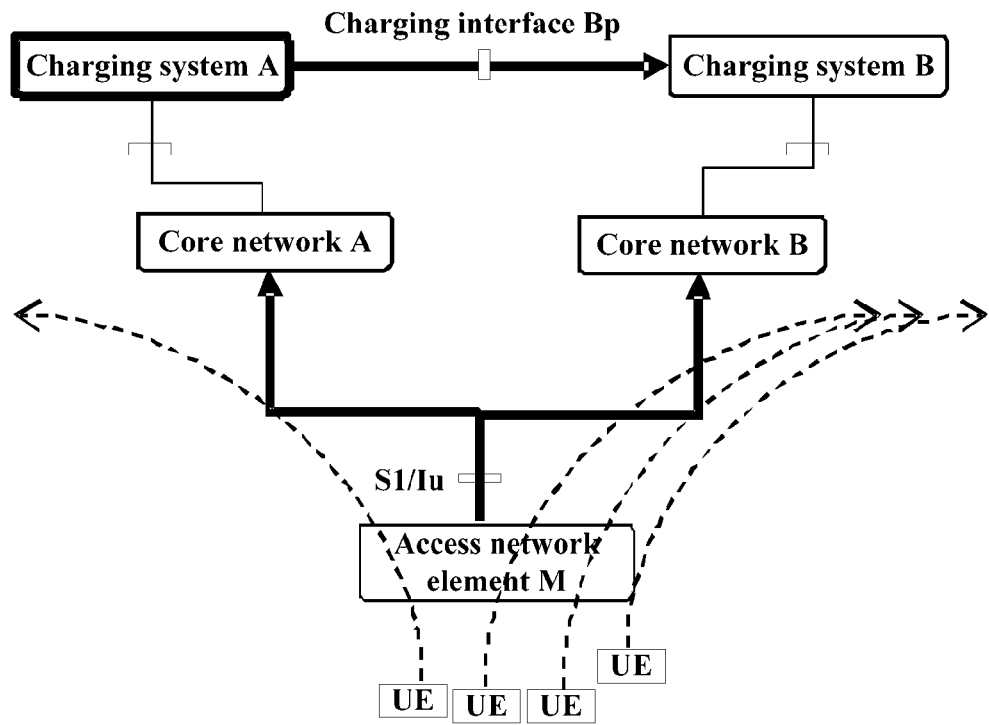
FIG. 3 is a schematic application diagram of sharing an access network element in a method for managing network sharing according to another embodiment of the present invention.

FIG. 3 is a schematic application diagram of network element sharing in a method for managing network sharing according to another embodiment of the present invention. The another embodiment provided in the present invention is similar to the preceding embodiment but differs in that: in this embodiment, management of network element sharing is described further in detail by using a core network A, a core network B, an access network element M, an operator A, and an operator B as examples.

Referring to FIG. 3, the core network A and the core network B share the access network element M, and are connected to the access network element M. The core network A is maintained by the operator A, and the core network B is maintained by the operator B. A charging interface Bp is set between a charging system of the core network A and a charging system of the core network B to facilitate reconciliation or settlement between the operators. The access network element M may be an eNB, an RNC, a BSC, or the like, and a connection interface between the access network element and the core network A and the core network B may be S1 or Iu (S1/Iu). The foregoing interfaces may be used by the access network element to report information about occupation of a shared resource occupied by a network sharing party.

Alternatively, if the access network element is a core-network network element and is connected to a charging function module of the charging system, the information about occupation of the shared resource occupied by the network sharing party is reported through the charging interface (Gf, Go), and no other interface is required for reporting the information about occupation of the shared resource occupied by the network sharing party.

It is assumed that different UEs including the operator A and the operator B have accessed the access network element M. After a UE accesses the access network element M, the UE chooses to access the core network A or the core network B according to a network state or homing information of the UE or default network selection settings or the like, and receives service of the selected core network.

On the access network element M, data statistics for charging are collected for network service of different operators or PLMNs accessed by means of the access network element M, or for the core network A or core network B accessed by the UE.

Specifically, the access network element M may distinguish a home operator of the UE, or, distinguish, according to a PLMN ID or an operator identifier of a network that serves the UE, information about occupation of a resource of the access network element M by each PLMN or operator.

The access network element M preferentially distinguishes a home operator or PLMN of the UE that accesses the access network element M. If a home operator or PLMN of the UE that accesses the access network element M is not found, the access network element M distinguishes a serving operator or PLMN of the UE that accesses the access network element M, or may select any operator or PLMN correlated with the UE that accesses the access network element M, such as an operator or PLMN of a source network.

The following methods may be available for the access network element M to distinguish the operator or PLMN of the home or accessed network of the UE:

1) The home operator or PLMN of the UE is distinguished, or the operator or PLMN of the network selected by the UE for accessing is distinguished according to the identifier of the UE, where the network selected by the UE for accessing may be a core network, an access network, a service network or the like.

2) The home operator or PLMN of the UE, or the operator or PLMN of the source network of the UE is distinguished according to an IMSI or a TMSI or a source C-RNTI of the UE, where the source network is a registration network when the UE accesses the network, or a network before handover.

3) The home operator or PLMN of the UE is distinguished according to a UE connection context, for example, the home operator or PLMN of the UE is obtained from the C-RNTI or an S1-AP connection identifier of the UE;

4) The access network element M distinguishes, according to a home operator or a PLMN reported by the UE that accesses the access network element M, the home operator or PLMN of the UE from information reported by the UE.

5) The operator or PLMN of a source network from which the UE moves or is handed over is distinguished by using an X2/Iur interface between network elements of an access network or an Sn/Gn (n=1 to 13) interface between network elements of a core network, where the source network is a registration network when the UE accesses the network or a network in which the UE is located before handover.

In addition, the access network element M also needs to acquire information which is about occupation of a resource of the access network element M by the UE and is corresponding to each operator or PLMN distinguished above, where the information is used for charging. The acquiring occupation information of a resource of the access network element M based on operator or PLMN includes: acquiring at least one of the following based on the distinguished operator or PLMN:

1) duration in which the UE uses the resource of the access network element M or data traffic thus generated, or a provided service, the number of events, an event type or an event level that the UE uses the access network element;

2) the number of UEs that access the access network element M, or the number of active or idle UEs that access the access network element M, and a ratio of each number of UEs to a total number of UEs that access the access network element M in all distinguished operators or PLMNs;

3) the number of a specific type of UEs that access the access network element M or the number of each of all types of UEs, or the number of UEs that support different numbers of MIMO streams and access the access network element M, or duration in which each type of UE occupies the resource of the access network element M or power consumption of the access network element M thus caused, where the number of MIMO streams may be 4×4 MIMOs, 2×2 MIMOs, or the like;

4) an air interface resource of the access network element M which is occupied by the UE that accesses the access network element M, which, for example, may include at least one item of the following data: a quantity or a ratio of occupied signaling or service data links on the air interface; a ratio of occupied air interfaces, maximum occupied air interface time-frequency resources and minimum occupied air interface time-frequency resources such as the number of RBs, bandwidth, or the like (the air interface time-frequency resources are not a constant value, and vary between certain values dynamically, and statistics of two extreme values of the variation may be used to calculate an average or a variance); the number of occupied physical layer radio resource block (Physical Radio Block, PRB) resources; the number of occupied radio connections and/or durations that the connections are occupied; the number of occupied bearer layer connections and/or durations the connections are occupied; and powers or a ratio of occupied air interface pilot channels, duration in which the above air interface resource is occupied or power consumption of the access network element M thus caused, where the ratio refers to a ratio of air interface resources of the access network element M which are occupied by one network sharing party to air interface resources of the access network element M which are occupied by other network sharing parties;

5) a transmission resource of the access network element M which is occupied by the UE that accesses the access network element M, which may include at least one item of the following data: quality of carrier index (Quality of Carrier Index, QCI) of user services of the UE that accesses the access network element M, user service traffic, a user rate, rate-guaranteed user services, a percentage of the rate-guaranteed user services and other statistic values, a quantity or a ratio of transmission link bandwidth occupied by the UE that accesses the access network M, a quantity of link bandwidth between an access-network network element and a core-network network element, duration in which the transmission resource is occupied, power consumption of the shared network M thus caused or a ratio of the power consumption, where the ratio refers to a ratio of transmission resources of the access network element M which are occupied by one network sharing party to transmission resources of the access network element M that are occupied by other network sharing parties;

6) a processor resource of the access network element M which is occupied by the UE that accesses the access network element M, which may include at least one item of the following data:

a quantity or a ratio of resources of a processor (such as a central processing unit CPU) which are occupied because the access network element M (eNB/RNC/BSC) or a network element (MME/SGSN/MSC) in the core network A or B provides access and/or service for the UE, a quantity or a ratio of consumption of the CPU of the access network element because the UE enjoys an application service, duration in which the processor resources are occupied, and power consumption of the access network element M caused by occupation of the CPU resources; and 7) a storage resource of the access network element M which is occupied by the UE that accesses the access network element M, which may include at least one item of the following data: a quantity or a ratio of storage resources occupied for the access network element or a core-network network element to provide a service for the UE, duration of occupation, and power consumption of the access network element M caused by occupation of the storage resources.

Statistics of the foregoing data are collected based on the home operator or PLMN of the UE that accesses the access network element M, or based on the operator or PLMN that provides a service for the UE that accesses the access network element M; if occupation of resources of the access network element M by the operator or PLMN exceeds a quota limit, further, recording of charging data further includes: recording a specific quantity in excess of the quota limit or an excess ratio.

In addition, the access network element M may report an identifier or a location of the access network element M, which may include at least one of: an ID, a geographic location, an administrative area number, or the like of an eNB/RNC.

In addition, the access network element M may also report data related to a service, the operator, or the PLMN, which may include at least one of: a service session identifier, an identifier of the service-providing operator or a PLMN identifier, or an UE identifier corresponding to the resource occupation data.

In addition, the access network element M may also report other related charging data, for example, a charging identifier (Charging ID) that is the same as that of a core network charging system, and may use the charging identifier to correlate an upper-layer service provided for the user, so as to perform correlated charging of physical layer transmission and a higher-layer service.

Under a sharing circumstance, a same charging identifier may exist between different operators or PLMNs, and the foregoing operator identifier, PLMN ID, UE identifier or the like may be combined with a charging criterion to distinguish, on the access network element, charging identifiers which are possibly the same.

During charging, the access network element M may report the resource occupation information to a charging system of a core network directly, or the resource occupation information is processed by a core-network network element and then reported to the charging system.

Figure 4:
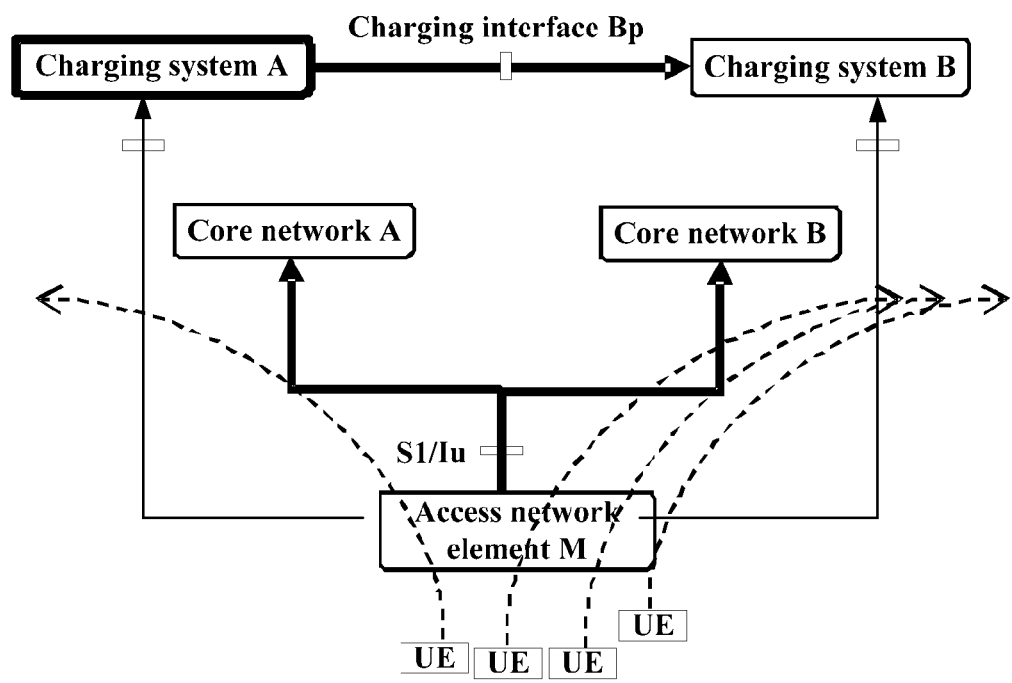
FIG. 4 is a schematic diagram of sharing a resource of an access network element in a method for managing network sharing according to another embodiment of the present invention.

When the access network element M reports the resource occupation information to a charging system directly, refer to FIG. 4.

If the access network element M is an access-network network element, a charging interface such as a Ga/Rf/Ro interface needs to be created between the access network element M and the charging system directly, so that a charging system A and a charging system B acquire, from the access network element M directly, the information about occupation of resources of the access network element M by the operator A and the operator B.

A charging interface connection created between the access network element M and the charging system of each sharing operator is shown in FIG. 4. In this embodiment, the access network element M separately creates a charging interface connection to the charging system A and the charging system B, so as to separately report to the charging system A and the charging system B, the information about occupation of the resources of the access network element M by their respective operators or PLMNs. It is assumed that the charging system A belongs to the operator A and the charging system B belongs to the operator B. Then the access network element M reports the acquired resource occupation information of the operator A to the charging system A, and reports the obtained resource occupation information of the operator B to the charging system B; or the access network element may also report the resource occupation information of all sharing operators to all the operators, where each operator may use the resource occupation information as data for charging or reconciliation.

In addition, to complete charging, a charging trigger (CTF) may be set on the access network element M. The trigger may be a threshold based on the resource occupation information, or a specified event. The charging trigger is set for a network element by using a charging system such as a policy and charging rules function (PolicyandChargingRulesFunction, PCRF) system or a network management system.

When the information about occupation of the resource of the access network element M by each operator or PLMN meets a trigger condition of the charging trigger, where the occupation information is acquired by the access network element M, for example, when the occupation information of a specific resource meets a corresponding threshold, or when a specified charging event occurs, the charging trigger triggers the access network element M to report the information about occupation of the resource of the access network element M by each operator or PLMN to the charging system through a charging interface.

Further, the access network element M may further receive a charging identifier (Charging Identity, hereinafter referred to as a charging ID) generated by the charging system, and correlates the received charging ID with the acquired information about occupation of a network resource occupied by a related operator or PLMN.

For example, the charging system A or the charging system B generates a charging ID according to triggering of the charging trigger in the access network element M, and sends the generated charging ID to the access network element M, and the access network element M correlates the received charging ID with resource occupation data corresponding to the operator or PLMN A or the operator or PLMN B.

When the occupation information, reported by the access network element M, of resources of the access network element M by the operator A or PLMN A or the operator B or PLMN B includes resource occupation that exceeds a quota, the charging system uses a new tariff rate or a new charging policy pre-negotiated by the operator or PLMN A or the operator or PLMN B so as to perform charging for the resource occupation in excess of the quota. When the charging system performs charging, for a part consumed in excess of the quota, a special tariff rate is executed according to the resource occupation information of the operator A or PLMN A or the operator B or PLMN B which is stored on the access network element M. The new tariff rate or the new charging policy may be configured by the network management system (NMS) or the charging system for the access network element or a core-network network element connected to the access network element.

Figure 5:
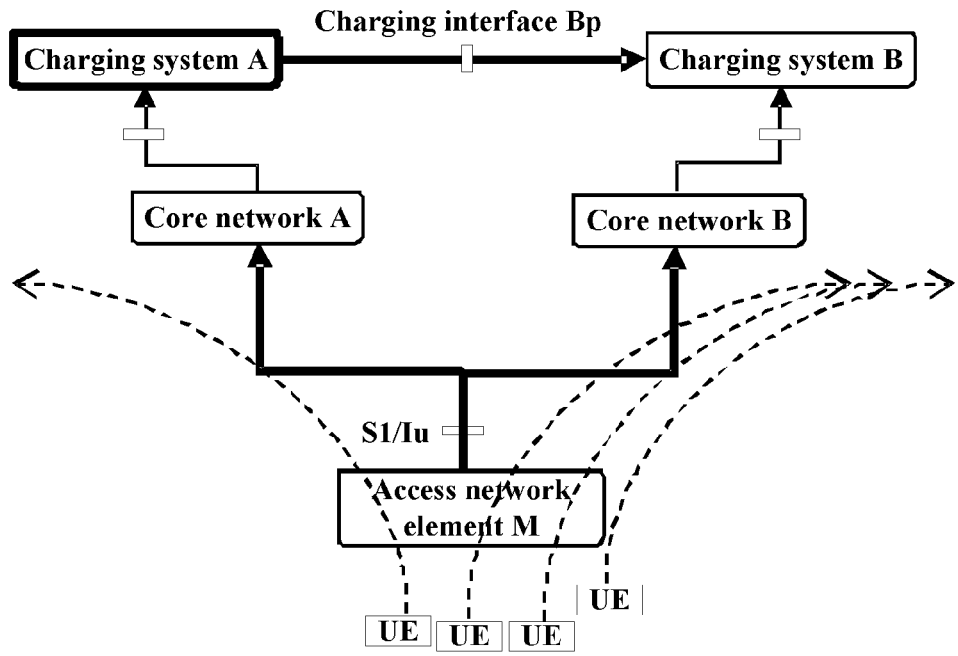
FIG. 5 is a schematic diagram of sharing a resource of an access network element in a method for managing network sharing according to another embodiment of the present invention.

When the access network element M uses the core-network network element to process the resource occupation information and then reports the resource occupation information to the charging system, refer to FIG. 5.

The access network element M does not trigger a charging event directly, but reports statistics of the resource occupation information of the operator or PLMN to a corresponding core-network network element of the operator or PLMN, and the corresponding core-network network element performs charging for the access network element M indirectly. The related core-network network element may be an MME, an S-GW, an SGSN, a GGSN, an MSC or the like. Specifically, the access network element M uses an S1/Iu interface to separately report to the core network A and the core network B, a part or all of the resource occupation information of their respective operator or PLMN A and operator or PLMN B. For example, resource occupation information of the operator or PLMN A is reported to a network element of the core network A of the operator or PLMN A, and resource occupation information of the operator or PLMN B is reported to a network element of the core network B of the operator or PLMN B.

On the network element of the core network A or the core network B, a threshold or an event for the foregoing data may be added as a charging trigger. After the charging trigger of the core-network network element triggers charging, the charging system generates a charging ID, and delivers the charging ID to a core-network network element, so as to correlate the resource occupation information which is reported by the access network element to the core-network network element. Correlated charging data for each UE and its serving operator or PLMN is formed by correlating a charging ID, a UE identifier, and a PLMN ID or operator identifier with the charging data generated by the core-network network element. The charging trigger of the core-network network element may be set by a PCRF or a network management system (NMS) of the operator.

Similarly, for the part consumed in excess of the quota, the charging system performs charging according to a new tariff rate or a new charging policy pre-negotiated by the operator or PLMN A or the operator or PLMN B, and charging and reconciliation are performed by using the resource occupation information of the operator or PLMN A and the operator or PLMN B which is stored on the access network element M. The data of the part consumed in excess of the quota comes from the access network element, an application server, a core-network network element, a self measurement of the UE, or the like. The new tariff rate or the new charging policy may be configured by the NMS or the PCRF for the access network element or the core-network network element connected to the access network element.

Figure 6:
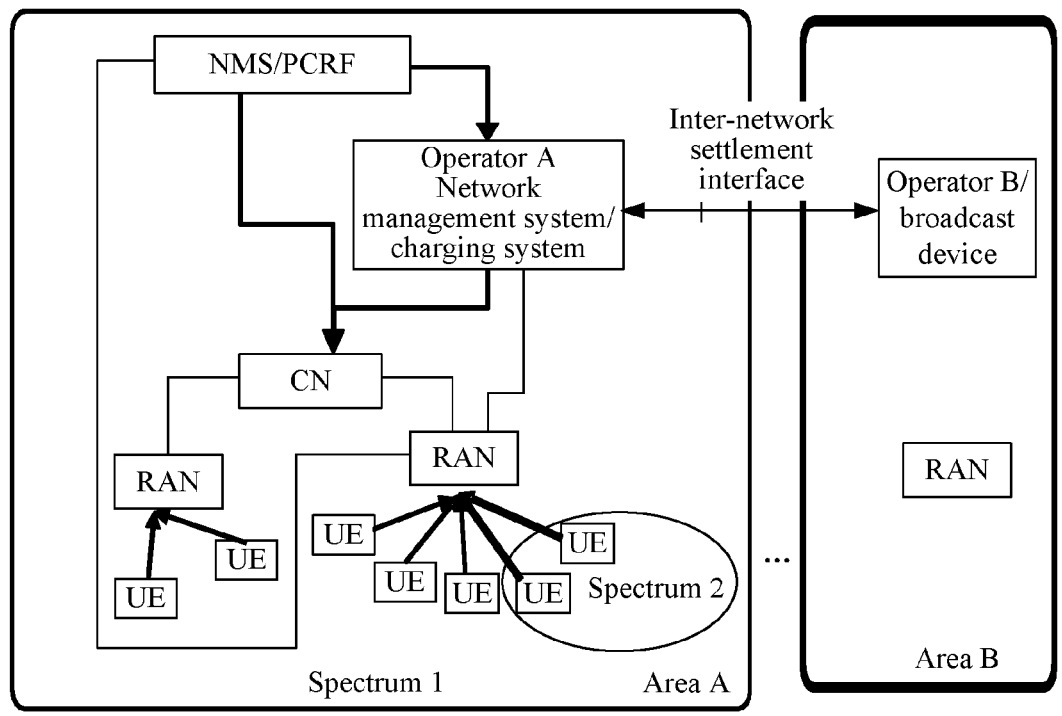
FIG. 6 is a schematic diagram of sharing a resource of an access network element in a method for managing network sharing according to another embodiment of the present invention.

FIG. 6 is a schematic application diagram of network element sharing in a method for managing network sharing according to another embodiment of the present invention. The another embodiment provided in the present invention is similar to the preceding embodiment but differs in that: in this embodiment, network element sharing is not performed, but spectrum sharing is performed. In this embodiment, a spectrum 1, a spectrum 2, an operator A, and an operator B are used as examples to describe charging in spectrum sharing in more detail.

In FIG. 6, a charging rule or a charging policy of spectrum sharing is deployed on an NMS/PCRF, for example, a spectrum usage quota and a tariff rate policy applicable to spectrum usage in excess of the quota are configured for a network element (including a CN network element and/or a RAN network element) where the operator A is deployed; and an operation administration and maintenance (Operation, Administration and Maintenance, OAM) or a charging system of the operator A may perform charging for spectrum sharing according to the charging rule or charging policy deployed on the NMS/PCRF.

The access-network network element (RAN) of the operator A may use the spectrum 2 of the operator B, and the operator A may recognize or specify information about a spectrum used by the UE, and/or spectrum usage information; and the UE may support carrier aggregation (Carrier Aggregation, CA) or allocate spectrums (frequency channel number recognition).

In an area A, only a network of the operator A is deployed, and the spectrum 1 is used, and the operator B owns the spectrum 2 in this area. The spectrum of the operator A in the area A may be deficient, and the operator A needs to lease the spectrum 2 from the operator B. When the operator A leases the spectrum 2 from the operator B, the spectrum 2 becomes a shared spectrum, and the operator A becomes a network sharer. A specific charge needs to be calculated according to the information about occupation of the spectrum 2 by the operator A at access of a UE.

In a case of access of a UE of the operator A which uses the spectrum 2, a charge may be obtained by acquiring at least one of information about a spectrum that carries UE signaling and user data, and data corresponding to the spectrum information.

The spectrum information is acquired when the UE of the operator A accesses the network. This is because, once the UE accesses the network, the spectrum in use is determined and therefore the spectrum information is also obtained.

The spectrum information includes: a spectrum number, or a specific center and bandwidth of the spectrum, or information about whether the spectrum is used for uplink transmission or downlink transmission or broadcast.

The data corresponding to the spectrum information is at least one type of the following data:

a) an access priority of the UE, and/or service priority information or type information of the UE;

b) duration of a session created by the UE, or data traffic occupied by the session of the UE;

c) the number of events or messages that serve the UE, and/or a service type and a service priority of the events or messages; and d) which upper-layer services are used by the UE, and specific usage information of the services, where the specific information of the services may include at least one of a service duration, a service type, service traffic, and a priority.

If both the UE and the network support carrier aggregation (Carrier Aggregation, CA), the UE may use multiple shared spectrums simultaneously, and at least one item of the following needs to be acquired: spectrum information of the multiple shared spectrums used by the UE, and data corresponding to spectrum information of each shared spectrum. The data corresponding to the spectrum information of each shared spectrum is at least one type of data in the foregoing types a) to d).

Further, the foregoing type d) of data and type e) of data need to be correlated with the used spectrum and service, so that the operator can evaluate a relationship between quality of a user service and the shared spectrum, or collect statistics on value of the shared spectrum to the service of the operator, so that the charging reflects the relationship or the value.

When M operators or PLMNs exist and N spectrums (WN) are shared, to evaluate contribution made by different shared spectrums of different operators to the quality of service or to perform inter-network settlement, it is also appropriate to: perform correlation or mapping between identifiers of operators or PLMNs of the shared spectrums and the corresponding spectrums, and establish relationships between different shared spectrum identifiers and the operators or PLMNs. In this way, by using the correlated spectrum identifiers, the data of the occupation information can be correlated with the corresponding operators or PLMNs to implement shared spectrum charging for multiple operators, or implement inter-network settlement.

Because the spectrum usage information can only be acquired from an access network (RAN)-side network element (such as an access network element accessed by the UE), the spectrum information may be acquired by the RAN network element of the operator A. The RAN-side network element may acquire information about specific usage of a shared spectrum by a user.

A core network (CN)-side network element, for example the foregoing core network device, may collect statistics of service data of the UE, such as the foregoing type d) of data, and perform the correlation operation.

When the information about occupation of the shared spectrum by the operator B is reported to the charging system, the RAN-side network element may directly open a connection between the charging interface and the charging system of the operator A; and, correspondingly, a charging trigger may be preset on the RAN-side network element, and, after the data meets a trigger condition of the charging trigger, the information about occupation of the shared spectrum by the operator B is reported to the charging system of the operator A.

Because an inter-network charging interface Bp exists between the charging system of the operator A and the charging system of the spectrum sharer (operator B), the charging system of the operator A may report the information about occupation of the shared spectrum by the operator B to the charging system of the operator B for charging, reconciliation, and the like.

Alternatively, the RAN network element or the CN network element may also directly enable a charging interface to the charging system of the sharer operator B, and report the data of the occupation information to the charging system of the sharer operator B for performing such operations as charging and reconciliation.

An operator-level network management system (NMS) or charging system (such as a policy and charging rules function (PCRF)) may preset a charging policy for the shared spectrum, where an object of the presetting may be a CN network element or a RAN network element or both. For example, it is set that, for an operator that does not own a spectrum, the CN network element or the RAN network element calculates a charge at a tariff rate xx, and calculates the charge based on time segments or the number of events; or, for example, it is set that the CN network element or the RAN network element executes a tariff rate XX for a specific time segment YY; or, for example, it is set that the CN network element or the RAN network element executes a tariff rate XX for usage of the spectrum 1, and executes a tariff rate YY for usage of the spectrum 2, and so on.

After the charging system completes charging, the operator A and the operator B perform charge settlement.

Further, for usage of the shared spectrum, a quota may be preset, that is, the usage of the shared spectrum corresponding to the operator may be restricted.

The preset quota may be one of or a combination of: a usage duration limit, a traffic limit, a limit of the number of times of usage by UEs, a limit of the number of UEs that use the spectrum (simultaneous usage or accumulated usage in a period), and a bandwidth limit which are corresponding to a certain spectrum.

The CN network element or the RAN network element may collect statistics of a ratio in excess of the quota or a specific amount in excess of the quota, which is used as one of charging bases.

In an application scenario of the access network element, a preset new charging policy needs to be executed to perform charging for the part consumed in excess of the quota, where the new charging policy may be configured by the NMS or the PCRF for the network element.

In the foregoing embodiment of the present invention, a home operator or PLMN of a UE that accesses an access network element, an operator or PLMN of an accessed network, or an operator or PLMN of a source network is distinguished, and information about occupation of a shared network resource occupied by each operator or PLMN is acquired based on operator or PLMN, thereby solving a problem of being unable to perform discriminative charging based on multiple operators or PLMNs in a scenario of an access network element of multiple operators or PLMNs. Still further, charging triggering is implemented on a shared access-network network element to make possible the foregoing discriminative charging for a shared resource. By acquiring and reporting resource occupation information of the access network element in excess of a quota, this embodiment of the present invention also solves an issue of charging based on spectrum usage in a spectrum sharing scenario, and especially, puts forward a new charging architecture and implements discriminative charging for a scenario such as CA in which it is hard to distinguish spectrum usage information.

Further, the shared spectrum is correlated with an upper-layer service to implement another management method and make the charging more flexible. Further, by acquiring and reporting occupation information of the shared resource in excess of the quota, this embodiment of the present invention also solves a problem of being unable to charge based on quota and unable to perform over-quota charging for a part occupied in excess of the quota. The method for managing an over-quota part in the embodiment of the present invention implements occupation of other resources than ordered resources and better protects benefits of a service provider.

Figure 7:
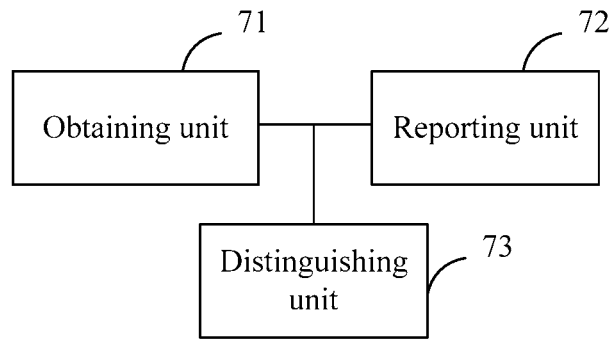
FIG. 7 is a schematic structural diagram of an access network element according to another embodiment of the present invention.

FIG. 7 is a schematic diagram of an access network element according to another embodiment of the present invention. The access network element is used to implement the method shown in FIG. 1, and includes an obtaining unit 71 and a reporting unit 72. The access network element provided in the embodiment of the present invention can execute actions that are executed by an access network element in any one embodiment shown in FIG. 1 to FIG. 6, and the same concepts and processes may not be described again.

The obtaining unit 71 is configured to acquire information about occupation of a shared network resource occupied by a network sharing party; and the reporting unit 72 is configured to report the occupation information to a core network device, where the occupation information is used by the core network device to charge a user equipment UE that accesses the access network element.

Further, the network sharing party is an operator of a home network of the UE that accesses the access network element, or a network accessed by the UE; or, the network sharing party is a public land mobile network PLMN of the home network of the UE that accesses the access network element, or a PLMN to which the network accessed by the UE belongs.

Further, the access network element further includes a distinguishing unit 73, configured to:

distinguish the network sharing party according to at least one of: a static identifier of the UE, a user identifier of the UE, a source C-RNTI of the UE, a connection context of the UE, information reported by the UE, and a network accessed by the UE; or distinguish the network sharing party by using an X2/Iur interface between network elements of an access network or an Sn/Gn interface between network elements of a core network, where the network sharing party is an operator of a source network accessed by the UE when the UE moves or is handed over, or a PLMN of the source network.

Further, the obtaining unit 71 is specifically configured to:

acquire at least one type of the following data based on operator or PLMN:

a first type of data, where the first type of data includes: data traffic generated by use of the access network element by the UE, duration in which the UE uses a resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

The reporting unit 72 is further configured to:

report identifier or location information of the access network element to the core network device, where the identifier or location information of the access network element is used by the core network device to correlate the access network element with the occupation information reported by the access network element and then perform charging.

The reporting unit 72 is further configured to:

report at least one of a service session identifier, a serving operator identifier, a serving PLMN identifier and an identifier of the UE which are corresponding to the occupation information to the core network device, for the core network device to correlate the occupation information with the network sharing party and then perform charging.

The reporting unit 72 is further configured to:

report, by the access network element, a service charging identifier of the UE to the core network device, where the service charging identifier is used by the core network device to correlate the occupation information with service charging of the UE and then perform charging.

In the embodiment of the present invention, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information.

The information about the spectrum occupied by the spectrum sharing party in the shared spectrum includes at least one item of the following information:

the number of a spectrum used by the UE in the shared spectrum, a central frequency of the spectrum or a bandwidth of the spectrum.

The usage data corresponding to the spectrum information includes at least one item of the following:

an eighth type of data, where the eighth type of data includes at least one of: a type of a link occupied by the spectrum used by the UE, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Optionally, the obtaining unit 71 is specifically configured to:

acquire, by using signaling for allocating a resource to the UE, signaling for instructing the UE by a network, identity data of the UE, or type data of the UE, information about a spectrum occupied in the shared spectrum by a home spectrum sharing party of the UE, or information about a spectrum occupied in the shared spectrum by a spectrum sharing party that serves the UE.

The information about occupation of the shared network resource occupied by the network sharing party further includes a specific amount or a ratio by which the shared network resource occupied by the network sharing party exceeds a quota.

Optionally, the core network device is a charging system, and the reporting unit 72 is specifically configured to:

determine a charging interface for reporting the occupation information to the charging system, and use the charging interface to report the occupation information to the charging system; and correspondingly, when the occupation information which is reported by the access network element meets a charging trigger condition, trigger, through the charging interface by using a charging trigger, the charging system to perform charging.

According to the access network element provided in this embodiment, an obtaining unit acquires and a reporting unit reports information about occupation of a resource of the access network element by a network sharing party, so that a charging system can perform accurate charging according to the information about occupation of the shared resource occupied by the network sharing party.

Figure 8:
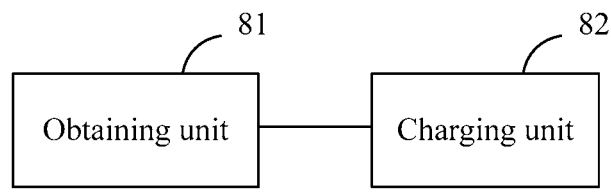
FIG. 8 is a schematic structural diagram of a core network device according to another embodiment of the present invention.

FIG. 8 is a schematic diagram of a core network device according to another embodiment of the present invention. The device provided in this embodiment is used to implement the method shown in FIG. 2, and includes an obtaining unit 81 and a processing unit 82. This embodiment of the present invention can execute actions that are executed by a core network device in the embodiments shown in FIG. 1 to FIG. 6, and the same or similar concepts or processes may not be described in this embodiment again.

The obtaining unit 81 is configured to obtain information about occupation of a resource of an access network element by a network sharing party; and the processing unit 82 is configured to charge, according to the occupation information, a user equipment UE that accesses the access network element.

Optionally, the network sharing party is an operator of a home network of the UE or a network accessed by the UE; or, the network sharing party is a public land mobile network PLMN of the home network of the UE or a PLMN to which the network accessed by the UE belongs.

Optionally, the shared network resource is a resource of the access network element, and the information about occupation of the shared network resource occupied by the network sharing party includes at least one type of the following data:

a first type of data, where the first type of data includes: data traffic generated by use of the access network element by the UE, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Optionally, the obtaining unit is specifically configured to receive the occupation information which is reported by the access network element through a charging interface, where the core network device is a charging system.

Optionally, the obtaining unit is specifically configured to receive identifier or location information of the access network element which is sent by the access network element; and the processing unit is specifically configured to correlate the access network element with the occupation information by using the identifier or location information of the access network element, and then perform charging.

Optionally, the obtaining unit is specifically configured to receive at least one of a service session identifier, a serving operator identifier, a serving PLMN identifier and an identifier of the UE which are corresponding to the occupation information and sent by the access network element; and the processing unit is specifically configured to correlate the occupation information with the network sharing party by using at least one of the service session identifier, the serving operator identifier, the serving PLMN identifier and the identifier of the UE, and then perform the charging.

Optionally, the obtaining unit is specifically configured to receive a service charging identifier of the UE which is sent by the access network element; and the processing unit is specifically configured to correlate the occupation information with service charging of the UE that accesses the access network element, and then perform the charging.

Optionally, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information, which are sent by the access network element.

Optionally, the information about the spectrum occupied by the spectrum sharing party in the shared spectrum includes at least one item of the following: the number of a spectrum used by the UE in the shared spectrum, a central frequency of the spectrum or a bandwidth of the spectrum.

Optionally, the usage data corresponding to the spectrum information includes at least one item of the following:

an eighth type of data, where the eighth type of data includes at least one of: a type of a link occupied by the spectrum used by the UE in the shared spectrum, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Correspondingly, the obtaining unit is specifically configured to receive a specific amount or a ratio by which the shared network resource occupied by the network sharing party exceeds a quota, where the specific amount or the ratio is sent by the access network element; and the processing unit is specifically configured to perform charging, according to the specific amount or the ratio by which the shared network resource occupied by the network sharing party exceeds the quota, for the shared network resource occupied by the network sharing party in excess of the quota.

According to the core network device provided in this embodiment, an obtaining unit receives information about occupation of a shared resource occupied by a network sharing party, and a processing unit performs charging according to the information about occupation of the shared resource occupied by the network sharing party, so that a charging system can perform accurate charging for network sharing.

Figure 9:
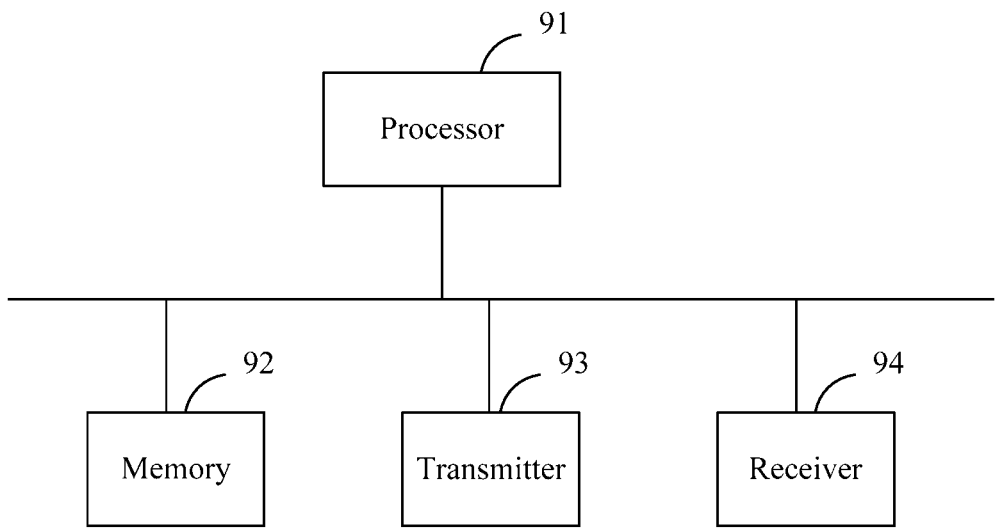
FIG. 9 is a schematic structural diagram of an access network element according to an embodiment of the present invention.

FIG. 9 is a schematic structural diagram of an access network element according to an embodiment of the present invention. As shown in FIG. 9, the access network element provided in this embodiment includes a processor 91 and a memory 92. This embodiment of the present invention can execute actions that are executed by an access network element in the embodiments shown in FIG. 1 to FIG. 6, and the same or similar concepts or processes may not be described in this embodiment again. The access network element may further include a transmitter 93 and a receiver 94. The memory 92, the transmitter 93 and the receiver 94 are connected to the processor 91 by means of a bus, where the bus may be one or more physical lines. When the bus is multiple physical lines, the bus may be categorized into an address bus, a data bus, a control bus, and the like. The memory 92 stores executable instructions. When the access network element runs, the processor 91 communicates with the memory 92, and the processor 91 invokes the executable instructions in the memory 92 to perform the following operations:

acquiring, by the access network element, information about occupation of a shared network resource occupied by a network sharing party; and reporting, by the access network element, the occupation information to a core network device, where the occupation information is used by the core network device to charge a user equipment UE that accesses the access network element.

Optionally, the network sharing party is an operator of a home network of the UE or a network accessed by the UE; or, the network sharing party is a public land mobile network PLMN of the home network of the UE or a PLMN to which the network accessed by the UE belongs.

Optionally, before the acquiring, by the access network element, information about occupation of a shared network resource occupied by a network sharing party, the method further includes:

distinguishing, by the access network element, the network sharing party according to at least one of: a static identifier of the UE, a user identifier of the UE, a cell radio network temporary identifier C-RNTI of a cell in which the UE is located, a connection context of the UE, information reported by the UE, and a network identifier of the network accessed by the UE.

Optionally, before the acquiring, by the access network element, information about occupation of a shared network resource occupied by a network sharing party, the method further includes:

distinguishing, by the access network element, the network sharing party by using an X2/Iur interface between network elements of an access network or an Sn/Gn interface between network elements of a core network, where the network sharing party is an operator of a source network accessed by the UE when the UE moves or is handed over, or a PLMN of the source network.

Optionally, the shared network resource is a resource of the access network element, and the information about occupation of the shared network resource occupied by the network sharing party includes at least one type of the following data:

a first type of data, where the first type of data includes: data traffic generated by use of the access network element by the UE, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Optionally, the foregoing operations further include:
reporting, by the access network element, identifier or location information of the access network element to the core network device, where the identifier or location information of the access network element is used by the core network device to correlate the access network element with the occupation information reported by the access network element and then perform charging.

Optionally, the foregoing operations further include:
reporting, by the access network element, at least one of a service session identifier, a serving operator identifier, a serving PLMN identifier and an identifier of the UE which are corresponding to the occupation information to the core network device, for the core network device to correlate the occupation information with the network sharing party and then perform charging.

Optionally, the foregoing operations further include:
reporting, by the access network element, a service charging identifier of the UE to the core network device, where the service charging identifier is used by the core network device to correlate the occupation information with service charging of the UE and then perform charging.

Optionally, when the network sharing party is a spectrum sharing party, the shared network resource is a shared spectrum for the spectrum sharing party from the access network element, and the UE is a UE that uses the shared spectrum; and Correspondingly, the information about occupation of the shared network resource occupied by the network sharing party includes:

either or a combination of information about a spectrum occupied by the spectrum sharing party in the shared spectrum, and usage data corresponding to the spectrum information.

Optionally, the information about the spectrum occupied by the spectrum sharing party in the shared spectrum includes at least one item of the following information: the number of a spectrum used by the UE in the shared spectrum, a central frequency of the spectrum or a bandwidth of the spectrum.

Optionally, the usage data corresponding to the spectrum information includes at least one item of the following:

an eighth type of data, where the eighth type of data includes at least one of: a type of a link occupied by the spectrum used by the UE, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Optionally, the acquiring, by the access network element, information about a spectrum occupied by the spectrum sharing party in the shared spectrum, includes:

acquiring, by the access network element by using signaling for allocating a resource to the UE, signaling for instructing the UE by a network, identity data of the UE, or type data of the UE, information about a spectrum occupied in the shared spectrum by a home spectrum sharing party of the UE, or information about a spectrum occupied in the shared spectrum by a spectrum sharing party that serves the UE.

Optionally, the information about occupation of the shared network resource occupied by the network sharing party further includes a specific amount or a ratio by which the shared network resource occupied by the network sharing party exceeds a quota.

When the core network device is a charging system, the reporting, by the access network element, the occupation information to the core network device, includes:

determining, by the access network element, a charging interface for reporting the occupation information to the charging system, and reporting the occupation information to the charging system by using the charging interface. Correspondingly, the operations further include:

when the occupation information which is reported by the access network element meets a charging trigger condition, triggering, by the access network element through the charging interface by using a charging trigger, the charging system to perform charging.

The access network element provided in this embodiment obtains information about occupation of a shared resource occupied by a network sharing party and reports the occupation information to a core network device, so that the core network device can perform accurate charging according to the information about occupation of the shared resource occupied by the network sharing party.

A hardware structure of a core network device in the present invention may still be the structure shown in FIG. 9, that is, the core network may also include a processor, a memory, a transmitter, and a receiver. The memory, the transmitter and the receiver are connected to the processor by means of a bus, where the bus may be one or more physical lines. When the bus is multiple physical lines, the bus may be categorized into an address bus, a data bus, a control bus, and the like. The memory stores executable instructions. At the time of running, the processor communicates with the memory, and the processor invokes the executable instructions in the memory to perform the following operations:

obtaining, by the core network device, information about occupation of a shared network resource occupied by a network sharing party; and charging, by the core network device according to the occupation information, a user equipment UE that accesses the access network element.

Optionally, the network sharing party is an operator of a home network of the UE or a network accessed by the UE; or, the network sharing party is a public land mobile network PLMN of the home network of the UE or a PLMN to which the network accessed by the UE belongs.

Optionally, the shared network resource is a resource of the access network element, and the information about occupation of the shared network resource occupied by the network sharing party includes at least one type of the following data:

a first type of data, where the first type of data includes: data traffic generated by use of the access network element by the UE, duration in which the UE uses the resource of the access network element, or a type of a provided service, the number of events, an event type, or an event level that the UE uses the access network element;

a second type of data, where the second type of data includes at least one of: the number of the UEs, the number of active UEs in the UEs, the number of idle UEs in the UEs, a ratio of the active UEs in the UEs to the UEs, and a ratio of the idle UEs in the UEs to the UEs;

a third type of data, where the third type of data includes at least one of: the number of UEs of a preset type in the UEs, the number of UEs of each type in the UEs, the number of UEs that support different numbers of multi-input multi-output MIMO streams in the UEs, duration in which each type of UE in the UEs occupies the access network element, and power consumption of the access network element caused by occupation of the resource occupied by each type of UE in the UEs;

a fourth type of data, where the fourth type of data includes at least one of: an air interface resource of the access network element which is occupied by the UE, duration in which the air interface resource is occupied, and power consumption of the access network element caused by occupation of the air interface resource;

a fifth type of data, where the fifth type of data includes at least one of: a transmission resource of the access network element which is occupied by the UE, duration in which the transmission resource is occupied, and power consumption of the access network element caused by occupation of the transmission resource;

a sixth type of data, where the sixth type of data includes at least one of: a processor resource of the access network element which is occupied by the UE, duration in which the processor resource is occupied, and power consumption of the access network element caused by occupation of the processor resource; and a seventh type of data, where the seventh type of data includes at least one of: a storage resource of the access network element which is occupied by the UE, duration in which the storage resource is occupied, and power consumption of the access network element caused by occupation of the storage resource.

Optionally, the core network device receives the information which is about occupation of the shared network resource occupied by the network sharing party and is sent by the access network element, and the receiving includes:

receiving, by the core network device, the occupation information which is reported by the access network element through a charging interface, where the core network device is a charging system.

Optionally, the charging, by the core network device according to the occupation information, the UE, includes:

receiving, by the core network device, identifier or location information of the access network element which is sent by the access network element; and correlating, by the core network device, the access network element with the occupation information by using the identifier or location information of the access network element, and then performing charging.

Optionally, the charging, by the core network device according to the occupation information, the UE, includes:

receiving, by the core network device, at least one of a service session identifier, a serving operator identifier, a serving PLMN identifier and an identifier of the UE which are corresponding to the occupation information and sent by the access network element; and correlating, by the core network device, the occupation information with the network sharing party by using at least one of the service session identifier, the serving operator identifier, the serving PLMN identifier and the identifier of the UE, and then performing charging.

Optionally, the charging, by the core network device according to the occupation information, the UE, includes:

receiving, by the core network device, a service charging identifier of the UE which is sent by the access network element; and correlating, by the core network device, the occupation information with service charging of the UE that accesses the access network element, and then performing charging.

Optionally, the network sharing party is a spectrum sharing party, the shared network resource is a shared spectrum for the spectrum sharing party from the access network element, and the UE is a UE that uses the shared spectrum; and the information about occupation of the shared network resource occupied by the network sharing party includes:

either or a combination of information about a spectrum occupied by the spectrum sharing party in the shared spectrum, and usage data corresponding to the spectrum information, which are sent by the access network element.

Optionally, the information about the spectrum occupied by the spectrum sharing party in the shared spectrum includes at least one item of the following:

the number of a spectrum used by the UE in the shared spectrum, a central frequency of the spectrum or a bandwidth of the spectrum.

Optionally, the usage data corresponding to the spectrum information includes at least one item of the following:

an eighth type of data, where the eighth type of data includes at least one of: a type of a link occupied by the spectrum used by the UE in the shared spectrum, and information about whether the used spectrum is used for broadcast;

a ninth type of data, where the ninth type of data includes at least one of: an access priority of the UE, service priority information of the UE, and service type information of the UE;

a tenth type of data, where the tenth type of data includes duration of a session created by the UE, or data traffic occupied by the session;

an eleventh type of data, where the eleventh type of data includes at least one of: the number of events or messages of the UE, a service type of the UE, and a service priority of the UE; and a twelfth type of data, where the twelfth type of data includes information about an upper-layer service used by the UE and information about usage of the upper-layer service.

Optionally, the core network device receives the information which is about occupation of the shared network resource occupied by the network sharing party and is sent by the access network element, and the receiving includes:

receiving, by the core network device, a specific amount or a ratio by which the shared network resource occupied by the network sharing party exceeds a quota, where the specific amount or the ratio is sent by the access network element; and, correspondingly, the charging, by the core network device according to the occupation information, the UE, includes:

performing charging, by the core network device according to the specific amount or the ratio by which the shared network resource occupied by the network sharing party exceeds the quota, for the shared network resource occupied by the network sharing party in excess of the quota.

The core network device provided in this embodiment obtains information about occupation of a shared resource occupied by a network sharing party, and performs charging according to the information about occupation of the shared resource occupied by the network sharing party, so that a charging system can perform accurate charging for network sharing.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention rather than limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for managing network sharing, applied in a network management system and comprising:

acquiring, by an access network element, occupation information about occupation of a shared network resource occupied by a network sharing party; and reporting, by the access network element, the occupation information to a charging system, wherein the occupation information is used by the charging system to charge a user equipment (UE) that accesses the access network element;

wherein, before the acquiring, by the access network element, the occupation information about occupation of the shared network resource occupied by the network sharing party, the method further comprises:

distinguishing, by the access network element, the network sharing party by using an Sn/Gn interface between network elements of a core network, wherein the network sharing party is an operator of a source network accessed by the UE when the UE moves or is handed over, or a public land mobile network (PLMN) of the source network.

2. The method according to claim 1, wherein distinguishing the network sharing party comprises:

distinguishing, by the access network element, the network sharing party according to at least one of: a static identifier of the UE, a user identifier of the UE, a cell radio network temporary identifier (C-RNTI) of a cell in which the UE is located, a connection context of the UE, information reported by the UE, and a network identifier of the network accessed by the UE.

3. The method according to claim 1, wherein the shared network resource is a resource of the access network element, and the occupation information about occupation of the shared network resource occupied by the network sharing party comprises at least one type of the following data or is determined according to at least one type of the following data:

a first type of data, wherein the first type of data comprises: data traffic generated by use of the access network element by the UE, duration in which the UE uses the resource of the access network element, or a type of a provided service, a number of events, an event type, or an event level that the UE uses the access network element;

a second type of data, wherein the second type of data comprises at least one of: a number of the UEs, a number of active UEs in the UEs, a number of idle UEs in the UEs, a ratio of the number of active UEs in the number of UEs to the UEs, and a ratio of the number of idle UEs in the UEs to the number of UEs;

a third type of data, wherein the third type of data comprises at least one of: a number of UEs of a preset type in the UEs, a number of UEs of each type in the UEs, a number of UEs that support different numbers of multi-input multi-output (MIMO) streams in the UEs, a duration in which each type of UE in the UEs occupies the access network element, and a power consumption of the access network element caused by occupation of the resource occupied by each type of UE in the UEs;

a fourth type of data, wherein the fourth type of data comprises at least one of: an air interface resource of the access network element which is occupied by the UE, a duration in which the air interface resource is occupied, and a power consumption of the access network element caused by occupation of the air interface resource;

a fifth type of data, wherein the fifth type of data comprises at least one of: a transmission resource of the access network element which is occupied by the UE, a duration in which the transmission resource is occupied, and a power consumption of the access network element caused by occupation of the transmission resource;

a sixth type of data, wherein the sixth type of data comprises at least one of: a processor resource of the access network element which is occupied by the UE, a duration in which the processor resource is occupied, and a power consumption of the access network element caused by occupation of the processor resource; and a seventh type of data, wherein the seventh type of data comprises at least one of: a storage resource of the access network element which is occupied by the UE, a duration in which the storage resource is occupied, and a power consumption of the access network element caused by occupation of the storage resource.

4. A method for managing network sharing, comprising:

obtaining, by a core network device from an access network element, occupation information about occupation of a shared network resource occupied by a network sharing party; and charging, by the core network device according to the occupation information, a user equipment (UE) that accesses the access network element, wherein the network sharing party is distinguished by using an Sn/Gn interface between network elements of a core network, wherein the network sharing party is an operator of a source network accessed by the UE when the UE moves or is handed over, or a public land mobile network (PLMN) of the source network.

5. The method according to claim 4, wherein the shared network resource is a resource of the access network element, and the occupation information about occupation of the shared network resource occupied by the network sharing party comprises at least one type of the following data or is determined according to at least one type of the following data:

a first type of data, wherein the first type of data comprises: data traffic generated by use of the access network element by the UE, a duration in which the UE uses the resource of the access network element, or a type of a provided service, a number of events, an event type, or an event level that the UE uses the access network element;

a second type of data, wherein the second type of data comprises at least one of: a number of the UEs, a number of active UEs in the UEs, a number of idle UEs in the UEs, a ratio of the number of active UEs in the UEs to the number of UEs, and a ratio of the number of idle UEs in the UEs to the number of UEs;

a third type of data, wherein the third type of data comprises at least one of: a number of UEs of a preset type in the UEs, a number of UEs of each type in the UEs, a number of UEs that support different numbers of multi-input multi-output (MIMO) streams in the UEs, a duration in which each type of UE in the UEs occupies the access network element, and a power consumption of the access network element caused by occupation of the resource occupied by each type of UE in the UEs;

a fourth type of data, wherein the fourth type of data comprises at least one of: an air interface resource of the access network element which is occupied by the UE, a duration in which the air interface resource is occupied, and a power consumption of the access network element caused by occupation of the air interface resource;

a fifth type of data, wherein the fifth type of data comprises at least one of: a transmission resource of the access network element which is occupied by the UE, a duration in which the transmission resource is occupied, and a power consumption of the access network element caused by occupation of the transmission resource;

a sixth type of data, wherein the sixth type of data comprises at least one of: a processor resource of the access network element which is occupied by the UE, a duration in which the processor resource is occupied, and a power consumption of the access network element caused by occupation of the processor resource; and a seventh type of data, wherein the seventh type of data comprises at least one of: a storage resource of the access network element which is occupied by the UE, a duration in which the storage resource is occupied, and a power consumption of the access network element caused by occupation of the storage resource.

6. The method according to claim 4, wherein the core network device receives the occupation information which is about occupation of the shared network resource occupied by the network sharing party and is sent by the access network element, and the receiving comprises:

receiving, by the core network device, the occupation information which is reported by the access network element through a charging interface, wherein the core network device is a charging system.

7. The method according to claim 4, wherein, the charging, by the core network device according to the occupation information, the UE, comprises:

receiving, by the core network device, an identifier or location information of the access network element which is sent by the access network element; and correlating, by the core network device, the access network element with the occupation information by using the identifier or location information of the access network element, and then performing charging.

8. An access network element, comprising:

a memory storing instructions; and a processor configured to execute the instructions to cause the access network element to:

acquire occupation information about occupation of a shared network resource occupied by a network sharing party; and report the occupation information to a core network device, wherein the occupation information is used by the core network device to charge a user equipment (UE) that accesses the access network element;

wherein, before the acquiring the occupation information about occupation of the shared network resource occupied by the network sharing party, the access network element is configured to:
distinguish the network sharing party by using an Sn/Gn interface between network elements of a core network, wherein the network sharing party is an operator of a source network accessed by the UE when the UE moves or is handed over, or a public land mobile network (PLMN) of the source network.

9. The access network element according to claim 8, wherein distinguishing the network sharing party comprises:
distinguishing the network sharing party according to at least one of: a static identifier of the UE, a user identifier of the UE, a source cell radio network temporary identifier (C-RNTI) of the UE, a connection context of the UE, information reported by the UE, and a network accessed by the UE.

10. The access network element according to claim 8, wherein acquiring the occupation information comprises acquiring at least one type of the following data:
a first type of data, wherein the first type of data comprises: data traffic generated by use of the access network element by the UE, a duration in which the UE uses a resource of the access network element, or a type of a provided service, the number of events, an event type, or an event level that the UE uses the access network element;
a second type of data, wherein the second type of data comprises at least one of: a number of the UEs, a number of active UEs in the UEs, a number of idle UEs in the UEs, a ratio of the number of active UEs in the UEs to the number of UEs, and a ratio of the number of idle UEs in the UEs to the number of UEs;
a third type of data, wherein the third type of data comprises at least one of: a number of UEs of a preset type in the UEs, a number of UEs of each type in the UEs, a number of UEs that support different numbers of multi-input multi-output (MIMO) streams in the UEs, a duration in which each type of UE in the UEs occupies the access network element, and a power consumption of the access network element caused by occupation of the resource occupied by each type of UE in the UEs;
a fourth type of data, wherein the fourth type of data comprises at least one of: an air interface resource of the access network element which is occupied by the UE, a duration in which the air interface resource is occupied, and a power consumption of the access network element caused by occupation of the air interface resource;
a fifth type of data, wherein the fifth type of data comprises at least one of: a transmission resource of the access network element which is occupied by the UE, a duration in which the transmission resource is occupied, and a power consumption of the access network element caused by occupation of the transmission resource;
a sixth type of data, wherein the sixth type of data comprises at least one of: a processor resource of the access network element which is occupied by the UE, a duration in which the processor resource is occupied, and a power consumption of the access network element caused by occupation of the processor resource; and
a seventh type of data, wherein the seventh type of data comprises at least one of: a storage resource of the access network element which is occupied by the UE, a duration in which the storage resource is occupied, and a power consumption of the access network element caused by occupation of the storage resource.

11. The access network element according to claim 8, wherein the reporting the occupation information to the core network device comprises:
reporting an identifier or location information of the access network element to the core network device, wherein the identifier or location information of the access network element is used by the core network device to correlate the access network element with the occupation information reported by the access network element and then perform charging.

12. A core network device, comprising:
a memory storing instructions; and
a processor configured to execute the instructions to cause the core network device to:
obtain, from an access network element, occupation information about occupation of a shared network resource occupied by a network sharing party; and
charge, according to the occupation information, a user equipment (UE) that accesses the access network element, wherein the network sharing party is distinguished by using an Sn/Gn interface between network elements of a core network, wherein the network sharing party is an operator of a source network accessed by the UE when the UE moves or is handed over, or a public land mobile network (PLMN) of the source network.

13. The core network device according to claim 12, wherein the shared network resource is a resource of the access network element, and the information about occupation of the shared network resource occupied by the network sharing party comprises at least one type of the following data:
a first type of data, wherein the first type of data comprises: data traffic generated by use of the access network element by the UE, a duration in which the UE uses the resource of the access network element, or a type of a provided service, a number of events, an event type, or an event level that the UE uses the access network element;
a second type of data, wherein the second type of data comprises at least one of: a number of the UEs, a number of active UEs in the UEs, a number of idle UEs in the UEs, a ratio of the number of active UEs in the UEs to the number of UEs, and a ratio of the number of idle UEs in the UEs to the number of UEs;
a third type of data, wherein the third type of data comprises at least one of: a number of UEs of a preset type in the UEs, a number of UEs of each type in the UEs, a number of UEs that support different numbers of multi-input multi-output (MIMO) streams in the UEs, a duration in which each type of UE in the UEs occupies the access network element, and a power consumption of the access network element caused by occupation of the resource occupied by each type of UE in the UEs;
a fourth type of data, wherein the fourth type of data comprises at least one of: an air interface resource of the access network element which is occupied by the UE, a duration in which the air interface resource is occupied, and a power consumption of the access network element caused by occupation of the air interface resource;

a fifth type of data, wherein the fifth type of data comprises at least one of: a transmission resource of the access network element which is occupied by the UE, a duration in which the transmission resource is occupied, and a power consumption of the access network element caused by occupation of the transmission resource;

a sixth type of data, wherein the sixth type of data comprises at least one of: a processor resource of the access network element which is occupied by the UE, a duration in which the processor resource is occupied, and a power consumption of the access network element caused by occupation of the processor resource; and a seventh type of data, wherein the seventh type of data comprises at least one of: a storage resource of the access network element which is occupied by the UE, a duration in which the storage resource is occupied, and a power consumption of the access network element caused by occupation of the storage resource.

14. The core network device according to claim 12, wherein, the obtaining the occupation information comprises receiving the occupation information that is reported by the access network element through a charging interface, wherein the core network device is a charging system.

15. The core network device according to claim 12, wherein,
the obtaining the occupation information comprises receiving an identifier or location information of the access network element which is sent by the access network element; and
the charging the UE that accesses the access network element comprises correlating the access network element with the occupation information by using the identifier or location information of the access network element, and then perform charging.

* * * * *